(12) United States Patent
Finger et al.

(10) Patent No.: US 7,721,308 B2
(45) Date of Patent: May 18, 2010

(54) SYNCHRONIZATION ASPECTS OF INTERACTIVE MULTIMEDIA PRESENTATION MANAGEMENT

(75) Inventors: James C. Finger, Kirkland, WA (US); John Andre Yovin, Woodinville, WA (US); Olivier Colle, Redmond, WA (US)

(73) Assignee: Microsoft Corproation, Redmond, WA (US)

( * ) Notice: Subject to any disclaimer, the term of this patent is extended or adjusted under 35 U.S.C. 154(b) by 1042 days.

(21) Appl. No.: 11/355,609

(22) Filed: Feb. 16, 2006

(65) Prior Publication Data

US 2007/0006080 A1    Jan. 4, 2007

Related U.S. Application Data

(60) Provisional application No. 60/695,944, filed on Jul. 1, 2005.

(51) Int. Cl.
*G06F 15/00* (2006.01)
(52) U.S. Cl. .................... 725/37; 715/719; 715/202; 715/255; 725/87
(58) Field of Classification Search ............. 715/719, 715/202, 255; 725/37, 87
See application file for complete search history.

(56) References Cited

U.S. PATENT DOCUMENTS

| | | | |
|---|---|---|---|
| 5,195,092 | A | 3/1993 | Wilson et al. |
| 5,208,745 | A | 5/1993 | Quentin et al. |
| 5,452,435 | A | 9/1995 | Malouf et al. |
| 5,515,490 | A | 5/1996 | Buchanan et al. |
| 5,631,694 | A | 5/1997 | Aggarwal et al. |
| 5,760,780 | A | 6/1998 | Larson et al. |
| 5,794,018 | A | 8/1998 | Vrvilo et al. |
| 5,966,121 | A | 10/1999 | Hubbell et al. |
| 6,067,638 | A | 5/2000 | Benitz et al. |
| 6,069,633 | A | 5/2000 | Apparao et al. |
| 6,100,881 | A | 8/2000 | Gibbons et al. |
| 6,212,595 | B1 | 4/2001 | Mendel |

(Continued)

FOREIGN PATENT DOCUMENTS

CA    2340144 A1    9/2001

(Continued)

OTHER PUBLICATIONS

Apple, Compressor 2 User Manual, Apr. 25, 2005, Apple.*

(Continued)

*Primary Examiner*—Nathan Hillery
(74) *Attorney, Agent, or Firm*—Mayer & Williams PC

(57) ABSTRACT

Playing an interactive multimedia presentation involves pre-rendering a media object at certain times based on a frame rate of the interactive content, a frame rate of the video content (which may include video, audio, data, or any combination thereof), and a play speed of the presentation. Certain actions taken include calculating a current elapsed play time representing an amount of the presentation's play duration that has passed. Based on the calculated time, a current interactive content presentation time is ascertained from an interactive content timeline. The interactive content timeline represents times at which the media object is presentable. A subsequent interactive content presentation time is selected from the interactive content timeline. The presentation state of the media object is predicted for the subsequent interactive content presentation time. The media object is pre-rendered within a time offset period before the subsequent interactive content presentation time occurs.

20 Claims, 10 Drawing Sheets

U.S. PATENT DOCUMENTS

| | | | |
|---|---|---|---|
| 6,369,830 | B1 | 4/2002 | Brunner et al. |
| 6,384,846 | B1 | 5/2002 | Hiroi |
| 6,426,778 | B1 | 7/2002 | Valdez, Jr. |
| 6,430,570 | B1 | 8/2002 | Judge et al. |
| 6,442,658 | B1 | 8/2002 | Hunt et al. |
| 6,453,459 | B1 | 9/2002 | Brodersen et al. |
| 6,577,341 | B1 | 6/2003 | Yamada et al. |
| 6,628,283 | B1 | 9/2003 | Gardner |
| 6,642,939 | B1 | 11/2003 | Vallone et al. |
| 6,700,588 | B1 | 3/2004 | MacInnis et al. |
| 6,785,729 | B1 | 8/2004 | Overby et al. |
| 6,906,643 | B2 | 6/2005 | Samadani et al. |
| 6,920,613 | B2 | 7/2005 | Dorsey et al. |
| 6,925,499 | B1 | 8/2005 | Chen et al. |
| 7,120,859 | B2 | 10/2006 | Wettach |
| 7,200,357 | B2 | 4/2007 | Janik et al. |
| 7,222,237 | B2 | 5/2007 | Wuidart et al. |
| 7,496,845 | B2 | 2/2009 | Deutscher et al. |
| 2001/0056504 | A1 | 12/2001 | Kuznetsov |
| 2001/0056580 | A1 | 12/2001 | Seo et al. |
| 2002/0091837 | A1 | 7/2002 | Baumeister et al. |
| 2002/0099738 | A1 | 7/2002 | Grant |
| 2002/0118220 | A1 | 8/2002 | Lui et al. |
| 2002/0138593 | A1 | 9/2002 | Novak et al. |
| 2002/0157103 | A1 | 10/2002 | Song et al. |
| 2002/0188616 | A1 | 12/2002 | Chinnici et al. |
| 2003/0026398 | A1 | 2/2003 | Duran et al. |
| 2003/0076328 | A1 | 4/2003 | Beda et al. |
| 2003/0174160 | A1 | 9/2003 | Deutscher et al. |
| 2003/0182364 | A1 | 9/2003 | Large et al. |
| 2003/0182624 | A1 | 9/2003 | Large |
| 2003/0204511 | A1 | 10/2003 | Brundage et al. |
| 2003/0204613 | A1 | 10/2003 | Hudson et al. |
| 2004/0027259 | A1 | 2/2004 | Soliman et al. |
| 2004/0034622 | A1 | 2/2004 | Espinoza et al. |
| 2004/0034795 | A1 | 2/2004 | Anderson et al. |
| 2004/0039834 | A1 | 2/2004 | Saunders et al. |
| 2004/0049793 | A1 | 3/2004 | Chou |
| 2004/0068510 | A1 | 4/2004 | Hayes et al. |
| 2004/0107179 | A1 | 6/2004 | Dalrymple, III |
| 2004/0111270 | A1 | 6/2004 | Whitham |
| 2004/0123316 | A1 | 6/2004 | Kendall et al. |
| 2004/0153648 | A1 | 8/2004 | Rotholtz et al. |
| 2004/0153847 | A1 | 8/2004 | Apte et al. |
| 2004/0156613 | A1 | 8/2004 | Hempel et al. |
| 2004/0187157 | A1 | 9/2004 | Chong et al. |
| 2004/0190779 | A1 | 9/2004 | Sarachik et al. |
| 2004/0205479 | A1 | 10/2004 | Seaman et al. |
| 2004/0210824 | A1 | 10/2004 | Shoff et al. |
| 2004/0220926 | A1 | 11/2004 | Lamkin et al. |
| 2004/0228618 | A1 | 11/2004 | Yoo et al. |
| 2004/0243927 | A1 | 12/2004 | Chung et al. |
| 2004/0250200 | A1 | 12/2004 | Chung et al. |
| 2004/0267952 | A1 | 12/2004 | He et al. |
| 2004/0268224 | A1 | 12/2004 | Balkus |
| 2005/0015815 | A1 | 1/2005 | Shoff et al. |
| 2005/0022116 | A1 | 1/2005 | Bowman et al. |
| 2005/0088420 | A1 | 4/2005 | Dodge et al. |
| 2005/0132266 | A1 | 6/2005 | Ambrosino et al. |
| 2005/0149729 | A1 | 7/2005 | Zimmer et al. |
| 2005/0183016 | A1 | 8/2005 | Horiuchi et al. |
| 2005/0251732 | A1 | 11/2005 | Lamkin et al. |
| 2005/0289348 | A1 | 12/2005 | Joy et al. |
| 2006/0041522 | A1 | 2/2006 | Rodriguez-Rivera |
| 2006/0274612 | A1 | 12/2006 | Kim |
| 2007/0002045 | A1 | 1/2007 | Finger et al. |
| 2007/0005757 | A1 | 1/2007 | Finger et al. |
| 2007/0005758 | A1 | 1/2007 | Hughes, Jr. et al. |
| 2007/0006061 | A1 | 1/2007 | Colle et al. |
| 2007/0006063 | A1 | 1/2007 | Jewsbury et al. |
| 2007/0006078 | A1 | 1/2007 | Jewsbury et al. |
| 2007/0006079 | A1 | 1/2007 | Hayes et al. |
| 2007/0006080 | A1 | 1/2007 | Finger et al. |
| 2007/0006233 | A1 | 1/2007 | Finger et al. |
| 2007/0006238 | A1 | 1/2007 | Finger et al. |
| 2007/0033419 | A1 | 2/2007 | Kocher et al. |
| 2007/0174387 | A1 | 7/2007 | Jania et al. |
| 2007/0198834 | A1 | 8/2007 | Ksontini et al. |
| 2007/0277245 | A1 | 11/2007 | Goto et al. |
| 2008/0126974 | A1 | 5/2008 | Fawcett et al. |

FOREIGN PATENT DOCUMENTS

| | | |
|---|---|---|
| EP | 1345119 A | 9/2003 |
| GB | 2344925 A | 6/2000 |
| WO | 0217179 A1 | 2/2002 |
| WO | 02091178 A | 11/2002 |

OTHER PUBLICATIONS

Apple, Final Cut Pro 5 User Manual, May 11, 2005, Apple.*

International Search Report for Application No. PCT/US2006/23905 of Jun 20, 2006, 7 pages.

Non Final Office Action for U.S. Appl. No. 11/405,736, dated May 18, 2009, 12 pages.

Cesar et al., "Open Graphical Framework for Interactive TV", IEEE Fifth International Symposium on Multimedia Software Engineering (ISMSE'03) p. 21, accessed at http://doi.ieeecomputersociety.org/10.1109/MMSE.2003.1254418 on Sep. 20, 2005.

C. Peng et al., "Digital Television Application Manager", Telecommunications Software and Multimedia Laboratory, Helsinki University of Technology, 2001 IEEE International Conference on Multimedia and Expo, 4 pages.

International Search Report for PCT/US2006/024292 dated May 7, 2007, 7 pages.

International Search Report for PCT/US06/23907 of Mar. 2, 2007, 7 pages.

Non-Final Office Action for U.S. Appl. No. 11/355,209, dated May 15, 2009, 12 pages.

International Search Report for PCT/US06/23911, mailed on Jun. 3, 2008, 8 pages.

International Search Report for PCT/US2006/024155, dated Feb. 26, 2007, 8 pages.

International Search Report for PCT/US2006/023906, dated Nov. 20, 2006, 6 pages.

International Search Report for PCT/US06/24034, dated Jun. 20, 2008, 10 pages.

International Search Report for PCT/US2006/024225, dated Feb. 26, 2006, 7 pages.

International Search Report for PCT/US2006/024226 dated Jun. 22, 2006, 7 pages.

Non Final Office Action for U.S. Appl. No. 11/405,737, dated May 18, 2009, 11 pages.

Non Final Office Action for U.S. Appl. No. 11/354,800, dated Sep. 13, 2007, 8 pages.

Non Final Office Action for U.S. Appl. No. 11/352,571, dated May 13, 2009, 9 pages.

Non Final Office Action for U.S. Appl. No. 11/350,595, dated Jun. 26, 2009, 4 pages.

Non Final Office Action for U.S. Appl. No. 11/351,085, dated Jun. 1, 2009, 14 pages.

Non Final Office Action for U.S. Appl. No. 11/354,800, dated Jul. 15, 2008, 7 pages.

Final Office Action for U.S. Appl. No. 11/354,800, dated May 1, 2009, 8 pages.

Advisory Action for U.S. Appl. No. 11/352,575, dated Jul. 14, 2009, 3 pages.

Final Office Action for U.S. Appl. No. 11/352,575, dated Apr. 28, 2009, 19 pages.

Non Final Office Action for U.S. Appl. No. 11/352,575, dated Sep. 2, 2008, 15 pages.

Non Final Office Action for U.S. Appl. No. 11/352,662, dated Jun. 2, 2009, 12 pages.

Anderson et al., "Building multiuser interactive multimedia environments at MERL", Multimedia, IEEE vol. 2, Issue 4, Winter 1995 pp.

77-82, accessed at http://ieeexplore.ieee.org/search/wrapper.jsp?arnumber=482298 on Sep. 30, 2005.

Borchers et al., "Musical Design Patterns: An Example of a Human-Centered Model of Interactive Multimedia", 1997 International Conference on Multimedia Computing and Systems (ICMCS'97) p. 63, accessed at http://doi.ieeecomputersociety.org/10.1109/MMCS.1997.609564 on Sep. 30, 2005.

Fritzsche, "Multimedia Building Blocks for Distributed Applications", 1996 International Workshop on Multimedia Software Development (MMSD '96) p. 0041, accessed at http://doi.ieeecomputersociety.org/10.1109/MMSD.1996.557742 on Sep. 30, 2005.

International Search Report for PCT/US2006/024294 dated Apr. 30, 2007, 7 pages.

International Search Report for PCT/US2006/024423 dated Apr. 24, 2007, 5 pages.

* cited by examiner

SYNCHRONIZATION ASPECTS OF INTERACTIVE MULTIMEDIA PRESENTATION MANAGEMENT

STATEMENT OF RELATED APPLICATION

This application claims the benefit of provisional application No. 60/695,944, filed Jul. 1, 2005, which is incorporated by reference herein.

BACKGROUND

Multimedia players are devices that render combinations of video, audio or data content ("multimedia presentations") for consumption by users. Multimedia players such as DVD players currently do not provide for much, if any, user interactivity during play of video content—video content play is generally interrupted to receive user inputs other than play speed adjustments. For example, a user of a DVD player must generally stop the movie he is playing to return to a menu that includes options allowing him to select and receive features such as audio commentary, actor biographies, or games.

Interactive multimedia players are devices (such devices may include hardware, software, firmware, or any combination thereof) that render combinations of interactive content concurrently with traditional video, audio or data content ("interactive multimedia presentations"). Although any type of device may be an interactive multimedia player, devices such as optical media players (for example, DVD players), computers and other electronic devices are particularly well positioned to enable the creation of, and consumer demand for, commercially valuable interactive multimedia presentations because they provide access to large amounts of relatively inexpensive, portable data storage.

Interactive content is generally any user-selectable visible or audible object presentable alone or concurrently with other video, audio or data content. One kind of visible object is a graphical object, such as a circle, that may be used to identify and/or follow certain things within video content—people, cars, or buildings that appear in a movie, for example. One kind of audible object is a click sound played to indicate that the user has selected a visible object, such as the circle, using a device such as a remote control or a mouse. Other examples of interactive content include, but are not limited to, menus, captions, and animations.

To enhance investment in interactive multimedia players and interactive multimedia presentations, it is desirable to ensure accurate synchronization of the interactive content component of interactive multimedia presentations with the traditional video, audio or data content components of such presentations. Accurate synchronization generally prioritizes predictable and glitch-free play of the video, audio or data content components. For example, when a circle is presented around a car in a movie, the movie should generally not pause to wait for the circle to be drawn, and the circle should follow the car as it moves.

It will be appreciated that the claimed subject matter is not limited to implementations that solve any or all of the disadvantages of specific interactive multimedia presentation systems or aspects thereof.

SUMMARY

In general, an interactive multimedia presentation includes one or more of the following: a play duration, a video content component, and an interactive content component. The video content component is referred to as a movie for exemplary purposes, but may in fact be video, audio, data, or any combination thereof. The video content component is arranged into a number of frames and/or samples for rendering by a video content manager. The video frame rate is a periodic time interval within which a particular group of video, audio, or data samples is presentable.

The interactive content is arranged for rendering by an interactive content manager at an interactive content frame rate that may be different than the video frame rate. For exemplary purposes, the interactive content component of the presentation is considered to be in the form of a media object having a presentation state. The media object is presentable at times within the play duration, referred to as interactive content presentation times, based on the interactive content frame rate. The interactive content presentation times may be conceptualized in the form of an interactive content timeline.

Methods, systems, apparatuses, and articles of manufacture discussed herein for playing an interactive multimedia presentation involve rendering the media object at certain times based on the video frame rate and on the play speed, so that the interactive content component and the video content component remain synchronized. Predicting times for pre-rendering media objects is useful when the play speed of the presentation changes, such as during trick play, to ensure frame-accurate rendering of the interactive content component and the video content component.

Certain actions taken during play of the presentation include calculating a current elapsed play time representing an amount of time of the play duration that has passed. Based on the current elapsed play time, a current interactive content presentation time is then determined from the interactive content timeline. A subsequent interactive content presentation time, which occurs at a different—perhaps prior or perhaps later—time than the current presentation time, is selected from the interactive content timeline.

The presentation state of the media object (for example, whether it is on or off) is predicted for the subsequent interactive content presentation time. The media object is then pre-rendered in a time offset period before the subsequent interactive content presentation time occurs. It is generally desirable to pre-render the media object one frame in advance of the subsequent interactive content presentation time. If media objects are pre-rendered too far in advance, there is no guarantee that the particular frames will be needed, and instructions executed for mis-predicted frames cannot be un-executed. In addition, pre-rendering media objects too far in advance may limit the ability to respond to user input in a timely manner. For example, when a user presses a virtual button a quick response is desired. Executing numerous pre-dicted frames prior to responding to the button press may cause the user to experience a delayed response.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter.

DETAILED DESCRIPTION

Figure 1:
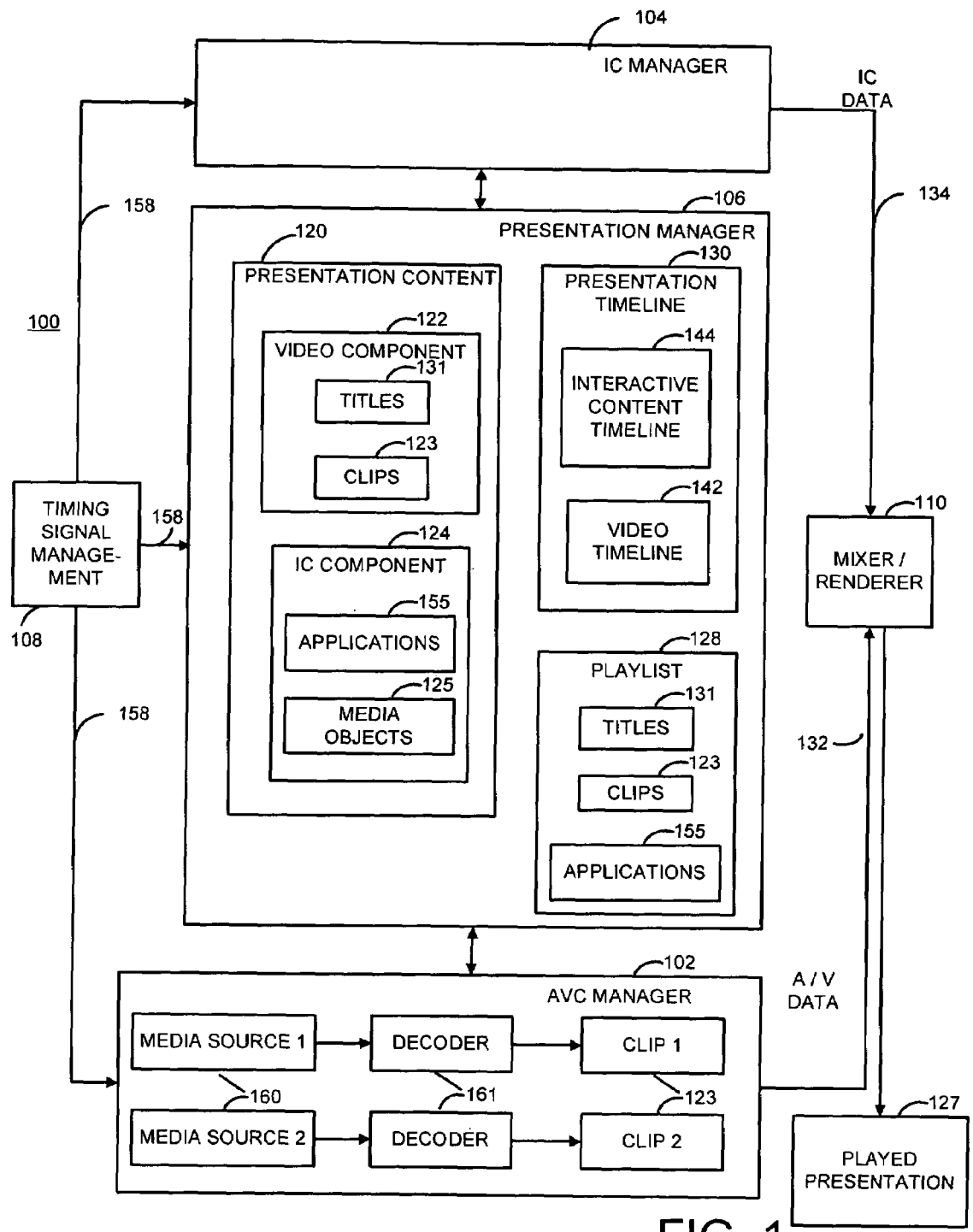
FIG. 1 is a simplified functional block diagram of an interactive multimedia presentation system.

Turning to the drawings, where like numerals designate like components, FIG. 1 is a simplified functional block diagram of an interactive multimedia presentation system ("Presentation System") 100. Presentation System 100 includes an audio/video content ("AVC") manager 102, an interactive content ("IC") manager 104, a presentation manager 106, a timing signal management block 108, and a mixer/renderer 110. In general, design choices dictate how specific functions of Presentation System 100 are implemented. Such functions may be implemented using hardware, software, or firmware, or combinations thereof.

In operation, Presentation System 100 handles interactive multimedia presentation content ("Presentation Content") 120. Presentation Content 120 includes a video content component ("video component") 122 and an interactive content component ("IC component") 124. Video component 122 and IC component 124 are generally, but need not be, handled as separate data streams, by AVC manager 102 and IC manager 104, respectively.

Presentation System 100 also facilitates presentation of Presentation Content 120 to a user (not shown) as played presentation 127. Played Presentation 127 represents the visible and/or audible information associated with Presentation Content 120 that is produced by mixer/renderer 110 and receivable by the user via devices such as displays or speakers (not shown). For discussion purposes, it is assumed that Presentation Content 120 and played presentation 127 represent high-definition DVD movie content, in any format. It will be appreciated, however, that Presentation Content 120 and Played Presentation 127 may be any type of interactive multimedia presentation now known or later developed.

Video component 122 represents the traditional video, audio or data components of Presentation Content 120. For example, a movie generally has one or more versions (a version for mature audiences, and a version for younger audiences, for example); one or more titles 131 with one or more chapters (not shown) associated with each title (titles are discussed further below, in connection with presentation manger 106); one or more audio tracks (for example, the movie may be played in one or more languages, with or without subtitles); and extra features such as director's commentary, additional footage, trailers, and the like. It will be appreciated that distinctions between titles and chapters are purely logical distinctions. For example, a single perceived media segment could be part of a single title/chapter, or could be made up of multiple titles/chapters. It is up to the content authoring source to determine the applicable logical distinctions. It will also be appreciated that although video component 122 is referred to as a movie, video component 122 may in fact be video, audio, data, or any combination thereof.

The video, audio, or data that forms video component 122 originates from one or more media sources 160 (for exemplary purposes, two media sources 160 are shown within A/V manager 102). A media source is any device, location, or data from which video, audio, or data is derived or obtained. Examples of media sources include, but are not limited to, networks, hard drives, optical media, alternate physical disks, and data structures referencing storage locations of specific video, audio, or data.

Groups of samples of video, audio, or data from a particular media source are referred to as clips 123 (shown within video component 122, AVC manager 102, and playlist 128). Referring to AVC manager 102, information associated with clips 123 is received from one or more media sources 160 and decoded at decoder blocks 161. Decoder blocks 161 represent any devices, techniques or steps used to retrieve renderable video, audio, or data content from information received from a media source 160. Decoder blocks 161 may include encoder/decoder pairs, demultiplexers, or decrypters, for example. Although a one-to-one relationship between decoders and media sources is shown, it will be appreciated that one decoder may serve multiple media sources, and vice-versa.

Audio/video content data ("A/V data") 132 is data associated with video component 122 that has been prepared for rendering by AVC manager 102 and transmitted to mixer/renderer 110. Frames of A/V data 132 generally include, for each active clip 123, a rendering of a portion of the clip. The exact portion or amount of the clip rendered in a particular frame may be based on several factors, such as the characteristics of the video, audio, or data content of the clip, or the formats, techniques, or rates used to encode or decode the clip.

IC component 124 includes media objects 125, which are user-selectable visible or audible objects optionally presentable concurrently with video component 122, along with any instructions (shown as applications 155 and discussed further below) for presenting the visible or audible objects. Media objects 125 may be static or animated. Examples of media objects include, among other things, video samples or clips, audio samples or clips, graphics, text, and combinations thereof.

Media objects 125 originate from one or more sources (not shown). A source is any device, location, or data from which media objects are derived or obtained. Examples of sources for media objects 125 include, but are not limited to, networks, hard drives, optical media, alternate physical disks, and data structures referencing storage locations of specific media objects. Examples of formats of media objects 125 include, but are not limited to, portable network graphics ("PNG"), joint photographic experts group ("JPEG"), moving picture experts group ("MPEG"), multiple-image network graphics ("MNG"), audio video interleave ("AVI"), extensible markup language ("XML"), hypertext markup language ("HTML"), and extensible HTML ("XHTML").

Applications 155 provide the mechanism by which Presentation System 100 presents media objects 125 to a user. Applications 155 represent any signal processing method or stored instruction(s) that electronically control predetermined operations on data. It is assumed for discussion purposes that IC component 124 includes three applications 155, which are discussed further below in connection with FIGS. 2 and 3. The first application presents a copyright notice prior to the movie, the second application presents, concurrently with visual aspects of the movie, certain media objects that provide a menu having multiple user-selectable items, and the third application presents one or more media objects that provide graphic overlays (such as circles) that may be used to identify and/or follow one or items appearing in the movie (a person, a car, a building, or a product, for example).

Interactive content data ("IC data") 134 is data associated with IC component 124 that has been prepared for rendering by IC manager 104 and transmitted to mixer/renderer 110. Each application has an associated queue (not shown), which holds one or more work items (not shown) associated with rendering the application.

Presentation manager 106, which is configured for communication with both AVC manager 104 and IC manager 102, facilitates handling of Presentation Content 120 and presentation of played presentation 127 to the user. Presentation manager 106 has access to a playlist 128. Playlist 128 includes, among other things, a time-ordered sequence of clips 123 and applications 155 (including media objects 125) that are presentable to a user. The clips 123 and applications 155/media objects 125 may be arranged to form one or more titles 131. For exemplary purposes, one title 131 is discussed herein. Playlist 128 may be implemented using an extensible markup language ("XML") document, or another data structure.

Presentation manager 106 uses playlist 128 to ascertain a presentation timeline 130 for title 131. Conceptually, presentation timeline 130 indicates the times within title 131 when specific clips 123 and applications 155 are presentable to a user. A sample presentation timeline 130, which illustrates exemplary relationships between presentation of clips 123 and applications 155 is shown and discussed in connection with FIG. 2. In certain circumstances, it is also useful to use playlist 128 and/or presentation timeline 130 to ascertain a video content timeline ("video timeline") 142 and an interactive content timeline ("IC timeline") 144.

Presentation manager 106 provides information, including but not limited to information about presentation timeline 130, to AVC manager 102 and IC manager 104. Based on input from presentation manger 206, AVC manager 102 prepares A/V data 132 for rendering, and IC manager 104 prepares IC data 134 for rendering.

Figure 4:
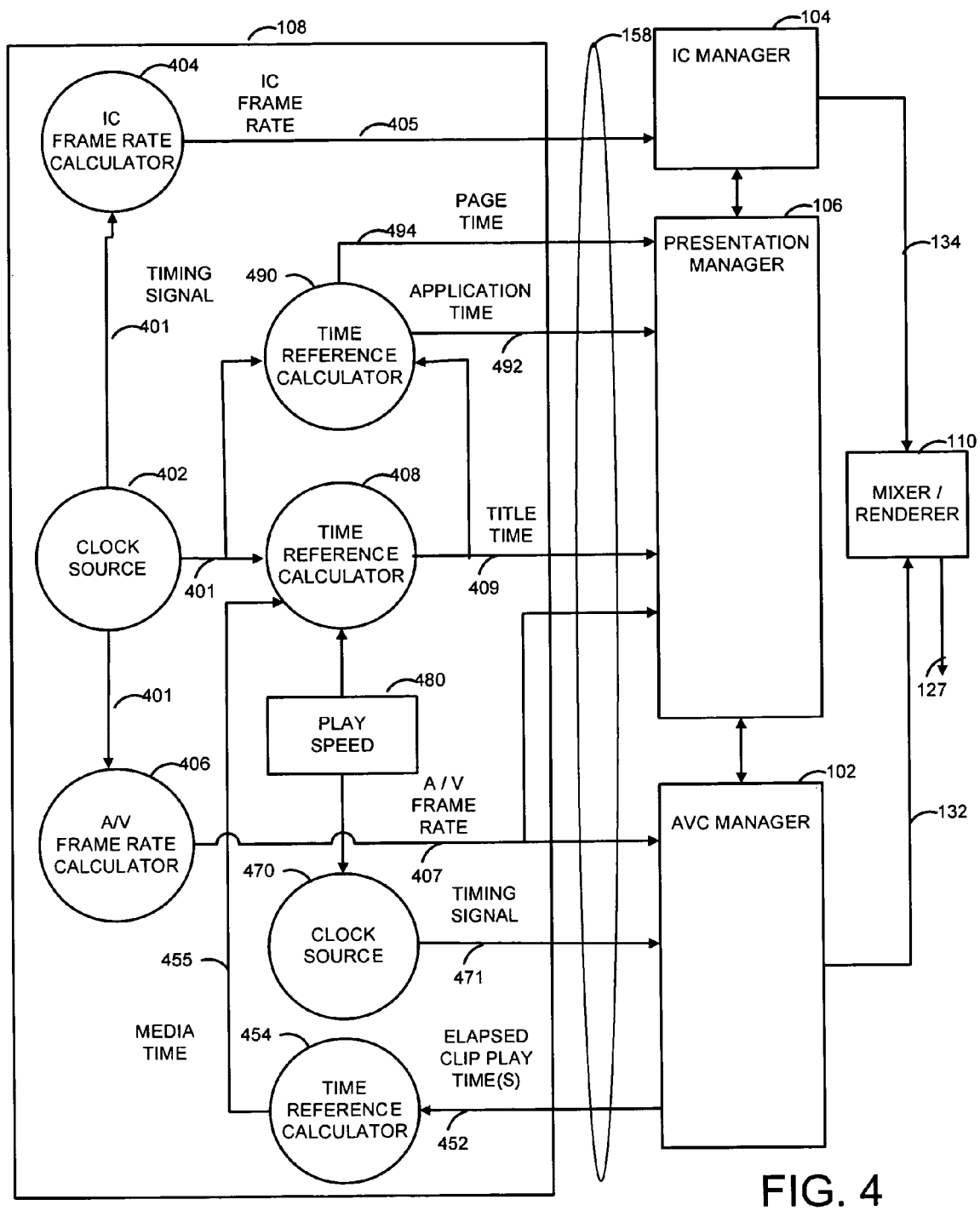
FIG. 4 is a simplified functional block diagram illustrating the timing signal management block of FIG. 1 in more detail.

Timing signal management block 108 produces various timing signals 158, which are used to control the timing for preparation and production of A/V data 132 and IC data 134 by AVC manager 102 and IC manager 104, respectively. In particular, timing signals 158 are used to achieve frame-level synchronization of A/V data 132 and IC data 134. Details of timing signal management block 108 and timing signals 158 are discussed further below, in connection with FIG. 4.

Mixer/renderer renders A/V data 132 in a video plane (not shown), and renders IC data 134 in a graphics plane (not shown). The graphics plane is generally, but not necessarily, overlayed onto the video plane to produce played presentation 127 for the user.

Figure 2:
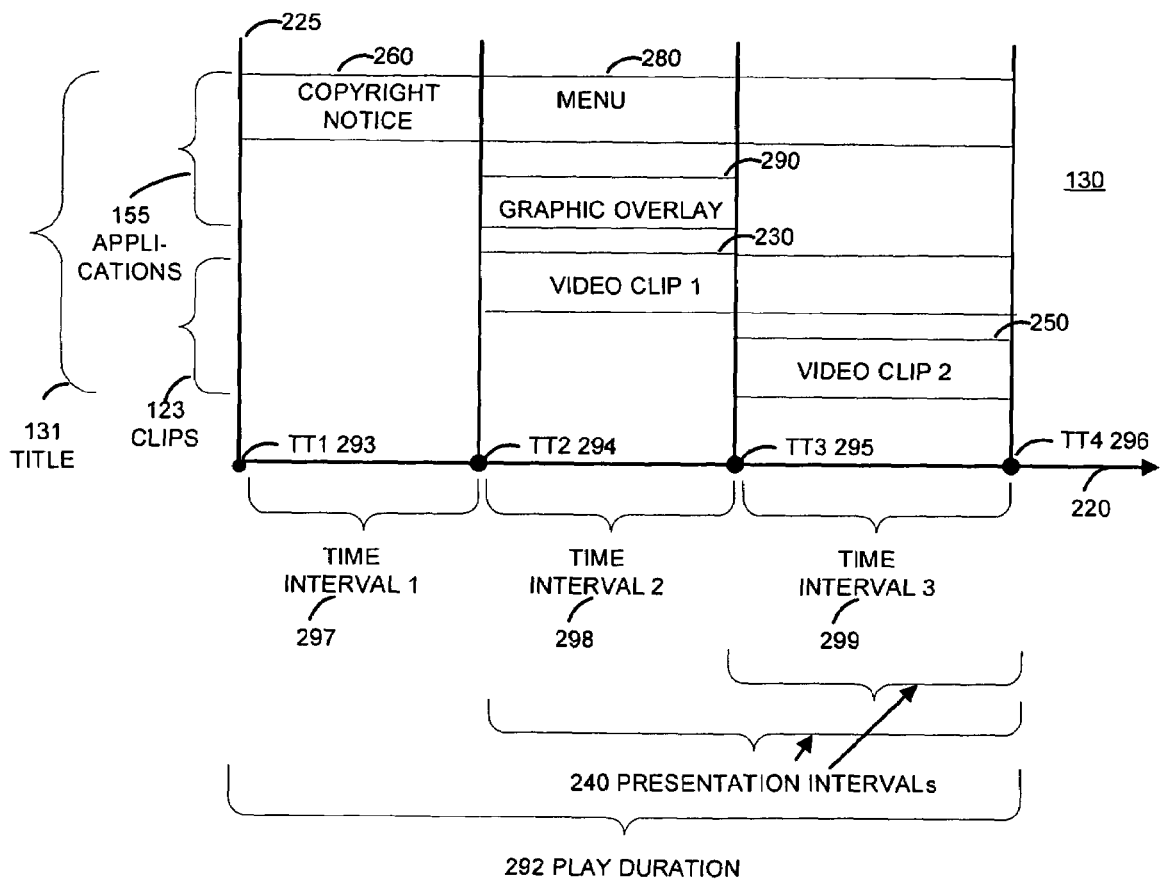
FIG. 2 is a graphical illustration of an exemplary presentation timeline, which is ascertainable from the playlist shown in FIG. 1.

With continuing reference to FIG. 1, FIG. 2 is a graphical illustration of a sample presentation timeline 130 for title 131 within playlist 128. Time is shown on horizontal axis 220. Information about video component 122 (clips 123 are illustrated) and IC component 124 (applications 155, which present media objects 125, are illustrated) is shown on vertical axis 225. Two clips 123 are shown, a first video clip ("video clip 1") 230 and a second video clip ("video clip 2") 250. For discussion purposes, as mentioned above in connection with FIG. 1, it is assumed that a first application is responsible for presenting one or more media objects (for example, images and/or text) that comprise copyright notice 260. A second application is responsible for presenting certain media objects that provide user-selectable items (for example, buttons with associated text or graphics) of menu 280. A third application is responsible for presenting one or more media objects that provide graphic overlay 290. Menu 280 is displayed concurrently with video clip 1 230 and video clip 2 250, and graphic overlay 290 is displayable concurrently with video clip 1 230 and menu 280.

The particular amount of time along horizontal axis 220 in which title 131 is presentable to the user is referred to as play duration 292 of title 131. Specific times within play duration 292 are referred to as title times. Four title times ("TTs") are shown on presentation timeline 130—TT1 293, TT2 294, TT3 295, and TT4 296. Because a title may be played once or may be played more than once (in a looping fashion, for example) play duration 292 is determined based on one iteration of title 131. Play duration 292 may be determined with respect to any desired reference, including but not limited to a predetermined play speed (for example, normal, or 1×, play speed), a predetermined frame rate, or a predetermined timing signal status. Play speeds, frame rates, and timing signals are discussed further below, in connection with FIG. 4. It will be appreciated that implementation-specific factors such as encoding techniques, display techniques, and specific rules regarding play sequences and timing relationships among clips and media objects for each title may impact upon exact values of a title's play duration and title times therein. The terms play duration and title times are intended to encompass all such implementation-specific details. Although title times at/within which content associated with IC component 124 is presentable are generally predetermined, it will be appreciated that actions taken when the user interacts with such content may only be determined based on user input while Played Presentation 127 is playing. For example, the user may select, activate, or deactivate certain applications, media objects, and/or additional content associated therewith during play of Played Presentation 127.

Other times and/or durations within play duration 292 are also defined and discussed herein. Video presentation intervals 240 are defined by beginning and ending times of play duration 292 between which particular content associated with video component 122 is playable. For example, video clip 1 230 has a presentation interval 240 between title times TT2 294 and TT4 294, and video clip 2 250 has a presentation interval 240 between title times TT3 295 and TT4 296. Application presentation intervals, application play durations, page presentation intervals, and page durations are also defined and discussed below, in connection with FIG. 3.

With continuing reference to FIG. 2, two types of time intervals are present within play duration 292. A first type of time interval is one in which video component 122 is not scheduled for presentation. Time interval 1 297, the time preceding presentation of the movie when copyright notice 260 is displayed, is an example of the first type of time interval. Although the application that presents copyright notice 260 is scheduled for presentation during time interval 1 297, it will be appreciated that it is not necessary for an application to be scheduled for presentation during the first type of time interval.

A second type of time interval is one in which video component 122 is scheduled for presentation. Time interval 2 298 and time interval 3 299 are examples of the second type of time interval. Sometimes, more than one video may be scheduled for presentation during the second type of time interval. Often, but not always, interactive content is presentable during the second type of time interval. For example, in time interval 2 298, menu 280 and graphic overlay 290 are scheduled for presentation concurrently with video clip 230. In time interval 3 299, menu 280 is scheduled for concurrent presentation with video clip 1 230 and video clip 2 250.

Figure 3:
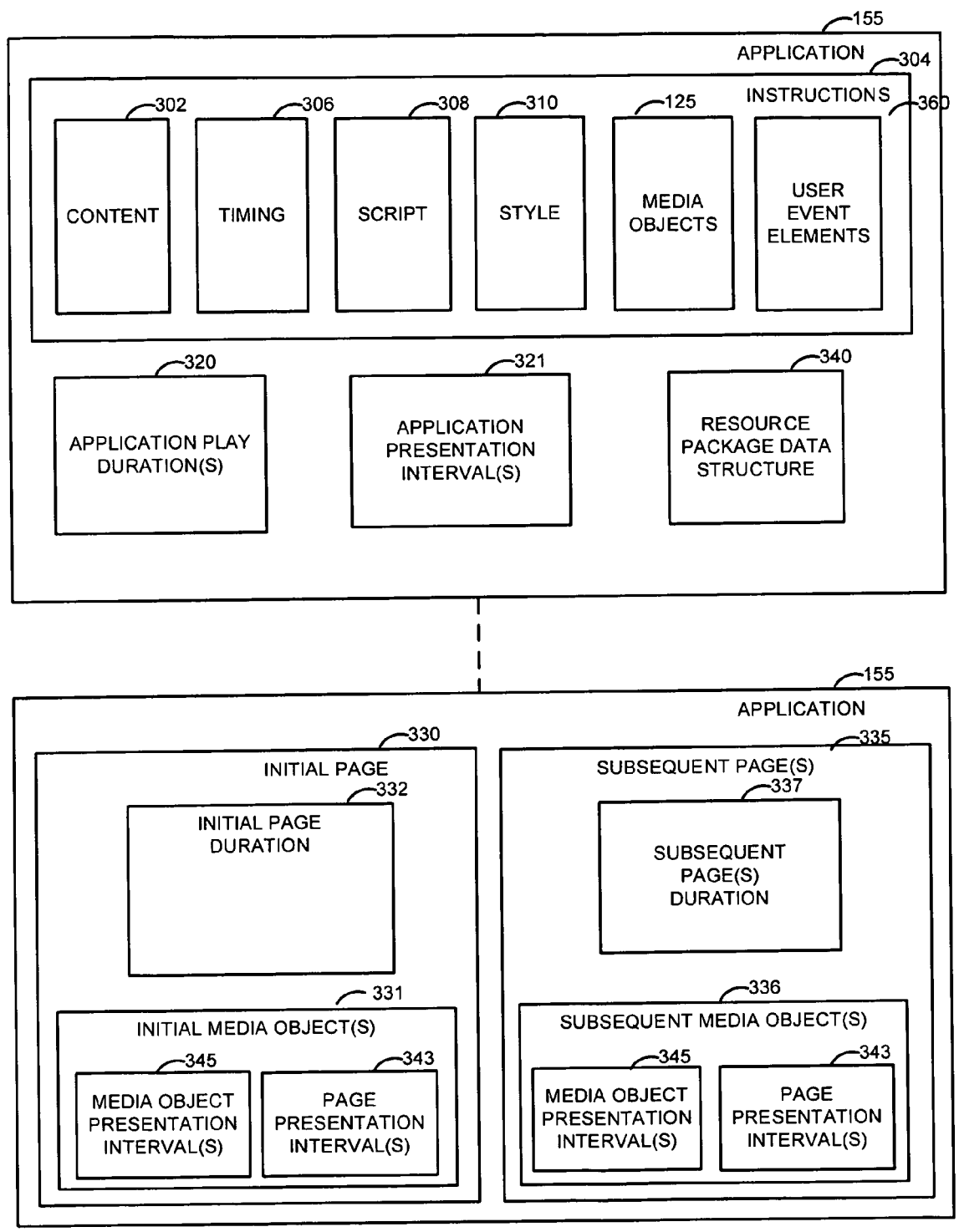
FIG. 3 is a simplified functional block diagram of an application associated with the interactive multimedia presentation shown in FIG. 1.

With continuing reference to FIGS. 1 and 2, FIG. 3 is a functional block diagram of a single application 155. Application 155 is generally representative of applications responsible for presenting media objects 260, 280, and 290. Application 155 includes instructions 304 (discussed further below). Application 155 has associated therewith a resource package data structure 340 (discussed further below), an application play duration 320, and one or more application presentation intervals 321.

Application play duration 320 is a particular amount of time, with reference to an amount (a part or all) of play duration 292 within which media objects 125 associated with application 155 are presentable to and/or selectable by a recipient of played presentation 127. In the context of FIG. 2, for example, application 155 responsible for copyright notice 260 has an application play duration composed of the amount of time between TT1 293 and TT2 294. The application responsible for menu 280 has an application play duration composed of the amount of time between TT2 294 and TT4 296. The application responsible for graphical overlay 290 has an application play duration composed of the amount of time between TT2 294 and ends at TT3 295.

The intervals defined by beginning and ending title times obtained when an application play duration 320 associated with a particular application is conceptualized on presentation timeline are referred to as application presentation intervals 321. For example, the application responsible for copyright notice 206 has an application presentation interval beginning at TT1 293 and ending at TT2 294, the application responsible for menu 280 has an application presentation interval beginning at TT2 294 and TT4 296, and the application responsible for graphic overlay 290 has an application presentation interval beginning at TT2 294 and TT3 295.

Referring again to FIG. 3, in some cases, application 155 may have more than one page. A page is a logical grouping of one or more media objects that are contemporaneously presentable within a particular application play duration 320 and/or application presentation interval 321. Media objects associated with a particular page, however, may be presented concurrently, serially, or a combination thereof. As shown, an initial page 330 has associated initial media object(s) 331, and subsequent pages 335 have associated media object(s) 336. Each page, in turn, has its own page duration. As shown, initial page 330 has page duration 332, and subsequent page(s) 335 has page duration 337. A page duration is the particular amount of time, with reference to an amount (a part or all) of application play duration 330, in which media objects 125 associated with a particular page are presentable to (and/or selectable by) a user.

The intervals defined by beginning and ending title times obtained when a page play duration associated with a particular page is conceptualized on the presentation timeline are referred to as page presentation intervals 343. Page presentation intervals 343 are sub-intervals of application presentation intervals 321. Specific media object presentation intervals 345 may also be defined within page presentation intervals 343.

The number of applications and pages associated with a given title, and the media objects associated with each application or page, are generally logical distinctions that are matters of design choice. Multiple pages may be used when it is desirable to manage (for example, limit) the number or amount of resources associated with an application that are loaded into memory during execution of the application. Resources for an application include the media objects used by the application, as well as instructions 304 for rendering the media objects. For example, when an application with multiple pages is presentable, it may be possible to only load into memory only those resources associated with a currently presentable page of the application.

Resource package data structure 340 is used to facilitate loading of application resources into memory prior to execution of the application. Resource package data structure 340 references memory locations where resources for that application are located. Resource package data structure 340 may be stored in any desirable location, together with or separate from the resources it references. For example, resource package data structure 340 may be disposed on an optical medium such a high-definition DVD, in an area separate from video component 122. Alternatively, resource package data structure 340 may be embedded into video component 122. In a further alternative, the resource package data structure may be remotely located. One example of a remote location is a networked server. Topics relating to handling the transition of resources for application execution, and between applications, are not discussed in detail herein.

Referring again to application 155 itself, instructions 304, when executed, perform tasks related to rendering of media objects 125 associated with application 155, based on user input. One type of user input (or a result thereof) is a user event. User events are actions or occurrences initiated by a recipient of played presentation 127 that relate to IC component 124. User events are generally, but not necessarily, asynchronous. Examples of user events include, but are not limited to, user interaction with media objects within played presentation 127, such as selection of a button within menu 280, or selection of the circle associated with graphical overlay 290. Such interactions may occur using any type of user input device now known or later developed, including a keyboard, a remote control, a mouse, a stylus, or a voice command. It will be appreciated that application 155 may respond to events other than user events, but such events are not specifically discussed herein.

In one implementation, instructions 304 are computer-executable instructions encoded in computer-readable media (discussed further below, in connection with FIG. 9). In the examples set forth herein, instructions 304 are implemented using either script 308 or markup elements 302, 306, 310, 312, 360. Although either script or markup elements may be used alone, in general, the combination of script and markup elements enables the creation of a comprehensive set of interactive capabilities for the high-definition DVD movie.

Script 308 includes instructions 304 written in a non-declarative programming language, such as an imperative programming language. An imperative programming language describes computation in terms of a sequence of commands to be performed by a processor. In most cases where script 308 is used, the script is used to respond to user events. Script 308 is useful in other contexts, however, such as handling issues that are not readily or efficiently implemented using markup elements alone. Examples of such contexts include system events and resource management (for example, accessing cached or persistently stored resources). In one implementation, script 308 is ECMAScript as defined by ECMA International in the ECMA-262 specification. Common scripting programming languages falling under ECMA-262 include JavaScript and JScript. In some settings, it may be desirable to implement 308 using a subset of ECMAScript 262, such as ECMA-327, along with a host environment and a set of application programming interfaces.

Markup elements 302, 306, 310, 312, and 360 represent instructions 304 written in a declarative programming language, such as Extensible Markup Language ("XML"). In XML, elements are logical units of information defined, using start-tags and end-tags, within XML documents. XML documents are data objects that are made up of storage units called entities (also called containers), which contain either parsed or unparsed data. Parsed data is made up of characters, some of which form character data, and some of which form markup. Markup encodes a description of the document's storage layout and logical structure. There is one root element in an XML document, no part of which appears in the content of any other element. For all other elements, the start-tags and end-tags are within the content of other elements, nested within each other.

An XML schema is a definition of the syntax(es) of a class of XML documents. One type of XML schema is a general-purpose schema. Some general-purpose schemas are defined by the World Wide Web Consortium ("W3C"). Another type of XML schema is a special-purpose schema. In the high-definition DVD context, for example, one or more special-purpose XML schemas have been promulgated by the DVD Forum for use with XML documents in compliance with the DVD Specifications for High Definition Video. It will be appreciated that other schemas for high-definition DVD movies, as well as schemas for other interactive multimedia presentations, are possible.

At a high level, an XML schema includes: (1) a global element declaration, which associates an element name with an element type, and (2) a type definition, which defines attributes, sub-elements, and character data for elements of that type. Attributes of an element specify particular properties of the element using a name/value pair, with one attribute specifying a single element property.

Content elements 302, which may include user event elements 360, are used to identify particular media object elements 312 presentable to a user by application 155. Media object elements 312, in turn, generally specify locations where data defining particular media objects 125 is disposed. Such locations may be, for example, locations in persistent local or remote storage, including locations on optical media, or on wired or wireless, public or private networks, such as on the Internet, privately-managed networks, or the World Wide Web. Locations specified by media object elements 312 may also be references to locations, such as references to resource package data structure 340. In this manner, locations of media objects 125 may be specified indirectly.

Timing elements 306 are used to specify the times at, or the time intervals during, which particular content elements 302 are presentable to a user by a particular application 155. Examples of timing elements include par, timing, or seq elements within a time container of an XML document.

Style elements 310 are generally used to specify the appearance of particular content elements 302 presentable to a user by a particular application.

User event elements 360 represent content elements 302, timing elements 306 or style elements 310 that are used to define or respond to user events.

Markup elements 302, 306, 310, and 360 have attributes that are usable to specify certain properties of their associated media object elements 312/media objects 125. In one implementation, these attributes/properties represent values of one or more clocks or timing signals (discussed further below, in connection with FIG. 4). Using attributes of markup elements that have properties representing times or time durations is one way that synchronization between IC component 124 and video component 122 is achieved while a user receives played presentation 127.

A sample XML document containing markup elements is set forth below (script 308 is not shown). The sample XML document includes style 310 and timing 306 elements for performing a crop animation on a content element 302, which references a media object element 312 called "id." The location of data defining media object 125 associated with the "id" media object element is not shown.

The sample XML document begins with a root element called "xml." Following the root element, several namespace "xmlns" fields refer to locations on the World Wide Web where various schemas defining the syntax for the sample XML document, and containers therein, can be found. In the context of an XML document for use with a high-definition DVD movie, for example, the namespace fields may refer to websites associated with the DVD Forum.

One content element 302 referred to as "id" is defined within a container described by tags labeled "body." Style elements 310 (elements under the label "styling" in the example) associated with content element "id" are defined within a container described by tags labeled "head." Timing elements 306 (elements under the label "timing") are also defined within the container described by tags labeled "head."

```
- <> <root xml:lang="en" xmlns="http://www.dvdforum.org/2005/ihd"
  xmlns:style="http://www.dvdforum.org/2005/ihd#style"
  xmlns:state="http://www.dvdforum.org/2005/ihd#state"
 - <> <head> (Head is the container of style and timing properties)
   - <> <styling> (Styling Properties are here)
     <style id="s-p" style:fontSize="10px" />
     <style id="s-bosbkg" style:opacity="0.4"
     style:backgroundImage="url('../../img/pass/boston.png')" />
     <style id="s-div4" style="s-bosbkg" style:width="100px"
     style:height="200px" />
     <style id="s-div5" style:crop="0 0 100 100" style="s-bosbkg"
     style:width="200px" style:height="100px" />
     <style id="s-div6" style:crop="100 50 200 150" style="s-bosbkg"
     style:width="100px" style:height="100px" />
   </styling>
   - <> <Timing> (Timing Properties are here)
     - <> <timing clock="title">
       - <> <defs>
         - <> <g id="xcrop">
           <set style:opacity="1.0" />
           <animate style:crop="0 0 100 200;200 0 300 200" />
         </g>
         - <> <g id="ycrop">
           <set style:opacity="1.0" />
           <animate style:crop="0 0 100 100;0 100 100 200" />
         </g>
         - <> <g id="zoom">
           <set style:opacity="1.0" />
           <animate style:crop="100 50 200 150;125 75 150 100" />
```

-continued

```
      </g>
    </defs>
  - <> <seq>
      <cue use="xcrop" select="//div[@id='d4']" dur="3s" />
      <cue use="ycrop" select="//div[@id='d5']" dur="3s" />
      <cue use="zoom" select="//div[@id='d6']" dur="3s" />
    </seq>
  </timing>
</head>
  - <> <body state:foreground="true"> Body is the container for content
    elements
    - <> <div id="d1"> The content starts here.
    - <> <p style:textAlign="center">
      Crop Animation Test
      <br />
      <span style:fontSize="12px">Start title clock to animate crop.</span>
      </p>
      </div>
    <> <div id="d4" style="s-div4" style:position="absolute"
      style:x="10%" style:y="40%">
        <p style="s-p">x: 0 -> 200</p>
      </div>
    - <> <div id="d5" style="s-div5" style:position="absolute"
      style:x="30%" style:y="40%">
      <p style="s-p">y: 0 -> 100</p>
      </div>
    - <> <div id="d6" style="s-div6" style:position="absolute"
      style:x="70%" style:y="60%">
      - <> <p style="s-p">
      x: 100 -> 125
      <br />
      y: 50 -> 75
      </p>
      </div>
    </body>
</root>
```

With continuing reference to FIGS. 1-3, FIG. 4 is a simplified functional block diagram illustrating various components of timing signal management block 108 and timing signals 158 in more detail.

Timing signal management block 108 is responsible for the handling of clocks and/or timing signals that are used to determine specific times or time durations within Presentation System 100. As shown, a continuous timing signal 401 is produced at a predetermined rate by a clock source 402. Clock source 402 may be a clock associated with a processing system, such as a general-purpose computer or a special-purpose electronic device. Timing signal 401 produced by clock source 402 generally changes continually as a real-world clock would—within one second of real time, clock source 402 produces, at a predetermined rate, one second worth of timing signals 401. Timing signal 401 is input to IC frame rate calculator 404, A/V frame rate calculator 406, time reference calculator 408, and time reference calculator 490.

IC frame rate calculator 404 produces a timing signal 405 based on timing signal 401. Timing signal 405 is referred to as an "IC frame rate," which represents the rate at which frames of IC data 134 are produced by IC manager 104. One exemplary value of the IC frame rate is 30 frames per second. IC frame rate calculator 404 may reduce or increase the rate of timing signal 401 to produce timing signal 405.

Frames of IC data 134 generally include, for each valid application 155 and/or page thereof, a rendering of each media object 125 associated with the valid application and/or page in accordance with relevant user events. For exemplary purposes, a valid application is one that has an application presentation interval 321 within which the current title time of play duration 292 falls, based on presentation timeline 130. It will be appreciated that an application may have more than one application presentation interval. It will also be appreciated that no specific distinctions are made herein about an application's state based on user input or resource availability.

A/V frame rate calculator 406 also produces a timing signal—timing signal 407—based on timing signal 401. Timing signal 407 is referred to as an "A/V frame rate," which represents the rate at which frames of A/V data 132 are produced by AVC manager 102. The A/V frame rate may be the same as, or different from, IC frame rate 405. One exemplary value of the A/V frame rate is 24 frames per second. A/V frame rate calculator 406 may reduce or increase the rate of timing signal 401 to produce timing signal 407.

A clock source 470 produces timing signal 471, which governs the rate at which information associated with clips 123 is produced from media source(s) 161. Clock source 470 may be the same clock as clock 402, or based on the same clock as clock source 402. Alternatively, clocks 470 and 402 may be altogether different, and/or have different sources. Clock source 470 adjusts the rate of timing signal 471 based on a play speed input 480. Play speed input 480 represents user input received that affects the play speed of played presentation 127. Play speed is affected, for example, when a user jumps from one part of the movie to another (referred to as "trick play"), or when the user pauses, slow-forwards, fast-forwards, slow-reverses, or fast-reverses the movie. Trick play may be achieved by making selections from menu 280 (shown in FIG. 2) or in other manners.

Time references 452 represent the amounts of time that have elapsed within particular presentation intervals 240 associated with active clips 123. For purposes of discussion herein, an active clip is one that has a presentation interval 240 within which the current title time of play duration 292 falls, based on presentation timeline 130. Time references 452 are referred to as "elapsed clip play time(s)." Time reference calculator 454 receives time references 452 and produces a media time reference 455. Media time reference 455 represents the total amount of play duration 292 that has elapsed based on one or more time references 452. In general, when two or more clips are playing concurrently, only one time reference 452 is used to produce media time reference 455. The particular clip used to determine media time reference 455, and how media time reference 455 is determined based on multiple clips, is a matter of implementation preference.

Time reference calculator 408 receives timing signal 401, media time reference 455, and play speed input 480, and produces a title time reference 409. Title time reference 409 represents the total amount of time that has elapsed within play duration 292 based on one or more of the inputs to time reference calculator 408. An exemplary method for calculating title time is shown and described in connection with FIG. 6.

Time reference calculator 490 receives timing signal 401 and title time reference 409, and produces application time reference(s) 492 and page time reference(s) 494. A single application time reference 492 represents an amount of elapsed time of a particular application play duration 320 (shown and discussed in connection with FIG. 3), with reference to continuous timing signal 401. Application time reference 492 is determined when title time reference 409 indicates that the current title time falls within application presentation interval 321 of the particular application. Application time reference 492 re-sets (for example, becomes inactive or starts over) at the completion of application presentation interval 321. Application time reference 492 may also re-set in other circumstances, such as in response to user events, or when trick play occurs.

Page time reference 494 represents an amount of elapsed time of a single page play duration 332, 337 (also shown and discussed in connection with FIG. 3), with reference to continuous timing signal 401. Page time reference 494 for a particular page of an application is determined when title time reference 409 indicates that the current title time falls within an applicable page presentation interval 343. Page presentation intervals are sub-intervals of application presentation intervals 321. Page time reference(s) 494 may re-set at the completion of the applicable page presentation interval(s) 343. Page time reference 494 may also re-set in other circumstances, such as in response to user events, or when trick play occurs. It will be appreciated that media object presentation intervals 345, which may be sub-intervals of application presentation intervals 321 and/or page presentation intervals 343, are also definable.

Table 1 illustrates exemplary occurrences during play of played presentation 127 by Presentation System 100, and the effects of such occurrences on application time reference 492, page time reference 494, title time reference 409, and media time reference 455.

title of a high-definition DVD movie is playing at normal speed, and a single application having three serially-presentable pages provides user interactivity.

The movie begins playing when the timing signal has a value of zero. When the timing signal has a value of 10, the application becomes valid and activates. Application time 492, as well as page time 494 associated with page one of the application, assumes a value of zero. Pages two and three are inactive. Title time 409 and media time 455 both have values of 10.

Page two of the application loads at timing signal value 15. The application time and page one time have values of 5, while the title time and the media time have values of 15.

Page three of the application loads when the timing signal has a value of 20. The application time has a value of 10, page two time has a value of 5, and page one time is inactive. The title time and the media time have values of 20.

The movie pauses at timing signal value 22. The application time has a value of 12, page three time has a value of two, and pages one and two are inactive. The title time and media

TABLE 1

| Occurrence | Application Time 492 | Page Time 494 | Title Time 409 | Media Time 455 |
|---|---|---|---|---|
| Movie starts | Inactive unless/until application is valid | Inactive unless/until applicable page is valid | Starts (e.g., at zero) | Starts (e.g., at zero) |
| Next clip starts | Inactive unless/until application is valid | Inactive unless/until applicable page is valid | Determined based on previous title time and elapsed clip play time | Re-sets/re-starts |
| Next title starts | Inactive unless/until application is valid | Inactive unless/until applicable page is valid | Re-sets/re-starts | Re-sets/re-starts |
| Application becomes valid | Starts | Starts when applicable page is valid | Continues/no effect | Continues/no effect |
| Trick Play | Re-sets/re-starts if applicable application is valid at the title time jumped to; otherwise becomes inactive | Re-sets/re-starts if applicable page is valid at the title time jumped to; otherwise becomes inactive | Based on jumped-to location, advances or retreats to time corresponding to elapsed play duration on presentation timeline | Advances or retreats to time corresponding to elapsed clip play time(s) of active clip(s) at the jumped-to location within the title |
| Change play speed times N | Continues/no effect | Continues/no effect | Elapses N times faster | Elapses N times faster |
| Movie pauses | Continues/no effect | Continues/no effect | Pauses | Pauses |
| Movie resumes | Continues/no effect | Continues/no effect | Resumes | Resumes |

Figure 5:
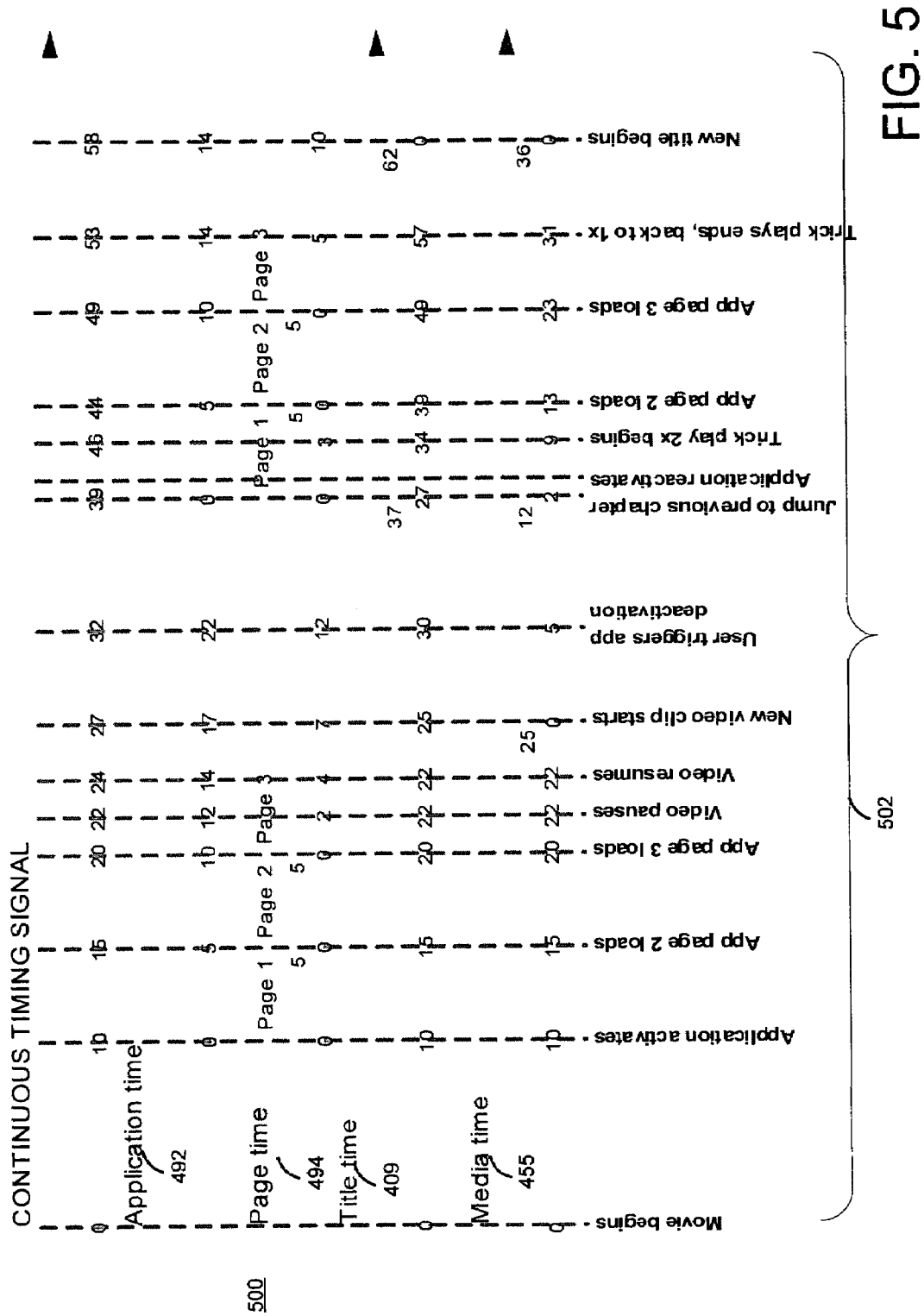
FIG. 5 is a schematic showing, with respect to a continuous timing signal, the effect of exemplary occurrences on the values of certain time references shown in FIG. 4.

FIG. 5 is a schematic, which shows in more detail the effects of certain occurrences 502 during play of played presentation 127 on application time reference 492, page time reference(s) 494, title time reference 409, and media time reference 455. Occurrences 502 and effects thereof are shown with respect to values of a continuous timing signal, such as timing signal 401. Unless otherwise indicated, a particular time have values of 22. The movie resumes at timing signal value 24. Then, the application time has a value of 14, page three time has a value of four, and the title time and media time have values of 22.

At timing signal value 27, a new clip starts. The application time has a value of 17, page three time has a value of 7, the title time has a value of 25, and the media time is re-set to zero.

A user de-activates the application at timing signal value 32. The application time has a value of 22, the page time has a value of 12, the title time has a value of 30, and the media time has a value of 5.

At timing signal value 39, the user jumps, backwards, to another portion of the same clip. The application is assumed to be valid at the jumped-to location, and re-activates shortly thereafter. The application time has a value of 0, page one time has a value of zero, the other pages are inactive, the title time has a value of 27, and the media time has a value of 2.

At timing signal value 46, the user changes the play speed of the movie, fast-forwarding at two times the normal speed. Fast-forwarding continues until timing signal value 53. As shown, the application and page times continue to change at a contstant pace with the continuous timing signal, unaffected by the change in play speed of the movie, while the title and media times change in proportion to the play speed of the movie. It should be noted that when a particular page of the application is loaded is tied to title time 409 and/or media time 455 (see discussion of application presentation interval(s) 321 and page presentation interval(s) 343, in connection with FIG. 3).

At timing signal value 48, a new title begins, and title time 409 and media time 455 are re-set to values of zero. With respect to the initial title, this occurs when the title time has a value of 62, and the media time has a value of 36. Re-setting (not shown) of application time 492 and page time 494 follows re-setting of title time 409 and media time 455.

Having access to various timelines, clock sources, timing signals, and timing signal references enhances the ability of Presentation System 100 to achieve frame-level synchronization of IC data 124 and A/V data 132 within played presentation 127, and to maintain such frame-level synchronization during periods of user interactivity.

With continuing reference to FIGS. 1-4, FIG. 6 is a flowchart of one method for enhancing the ability of an interactive multimedia presentation system, such as Presentation System 100, to synchronously present interactive and video components of an interactive multimedia presentation, such as IC component 124 and video component 122 of Presentation Content 120/played presentation 127.

The method involves predicting and pre-rendering a media object, such as media object 125, prior to the time at which the media object is scheduled for presentation. It will be appreciated that any number of media objects may be pre-rendered, but for exemplary purposes one media object is discussed.

The media object has a presentation state, which represents one or more properties that are used to indicate whether and/or how the media object is presentable within the presentation. Examples of the properties represented by the presentation state of the media object include states of various clocks or timing signals, or states of various user gestures with respect to the media object.

The method is discussed in the context of Presentation System 100. It will be appreciated that any number of media objects may be pre-rendered, but for exemplary purposes one media object is discussed. Video component 122 and IC component 124 are presented to a user as A/V data 132 and IC data 134, respectively, within an amount of time represented by play duration 292. A/V data 132 is arranged for rendering by AVC manager 102, which arranges one or more clips 123 into a plurality of video frames at a rate based on A/V frame rate 407. Video frames include samples of video, audio, data, or any combination thereof, and the video frame rate is a periodic time interval within which a particular group of video, audio, or data samples is presentable.

Figure 7A:
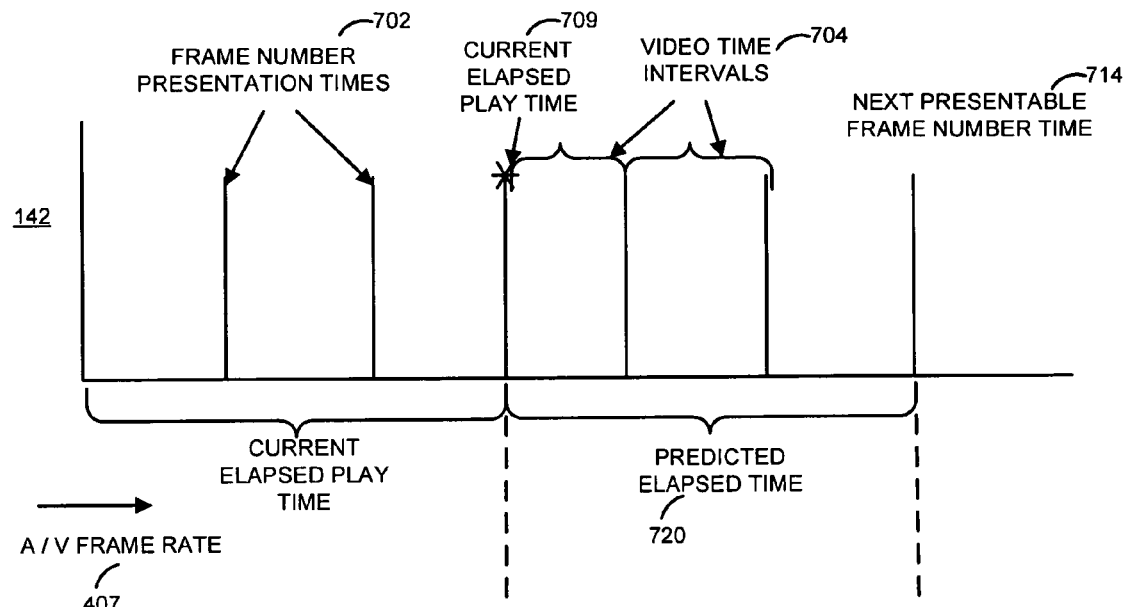
FIG. 7A is a schematic of an exemplary video timeline usable in connection with certain aspects of the flowcharts of FIGS. 6 and 8.

An exemplary video timeline 142 with reference to A/V frame rate 407 is shown in FIG. 7A. Various frame number presentation times 702 are indicated on video timeline 142. Frame number presentation times 702 represent times within play duration 292 at which individual numbered frames of A/V data 132 are presentable. As shown, frame number presentation times 702 occur at a rate based on A/V frame rate 407, which also defines the duration of periodic video time intervals 704 between frame number presentation times 702. The remainder of FIG. 7A is discussed further below.

Media object 125 is arranged for rendering by IC manager 104, which presents the media object, in accordance with the presentation state, in a plurality of interactive content frames at a rate based on IC frame rate 405. IC frame rate 405 is decoupled from A/V frame rate 407.

The method begins at block 600, and continues at block 602, where a video frame rate, an interactive content frame rate, and a play speed of the presentation are ascertained.

For exemplary purposes, A/V frame rate 407 is assumed to be 24 frames per second (note that it is not necessary for frame rate 407 to be the same as the frame rate at which a particular clip 123 was recorded), IC frame rate 405 is assumed to be 30 frames per second, and the play speed is assumed to be normal, or 1×.

Figure 7B:
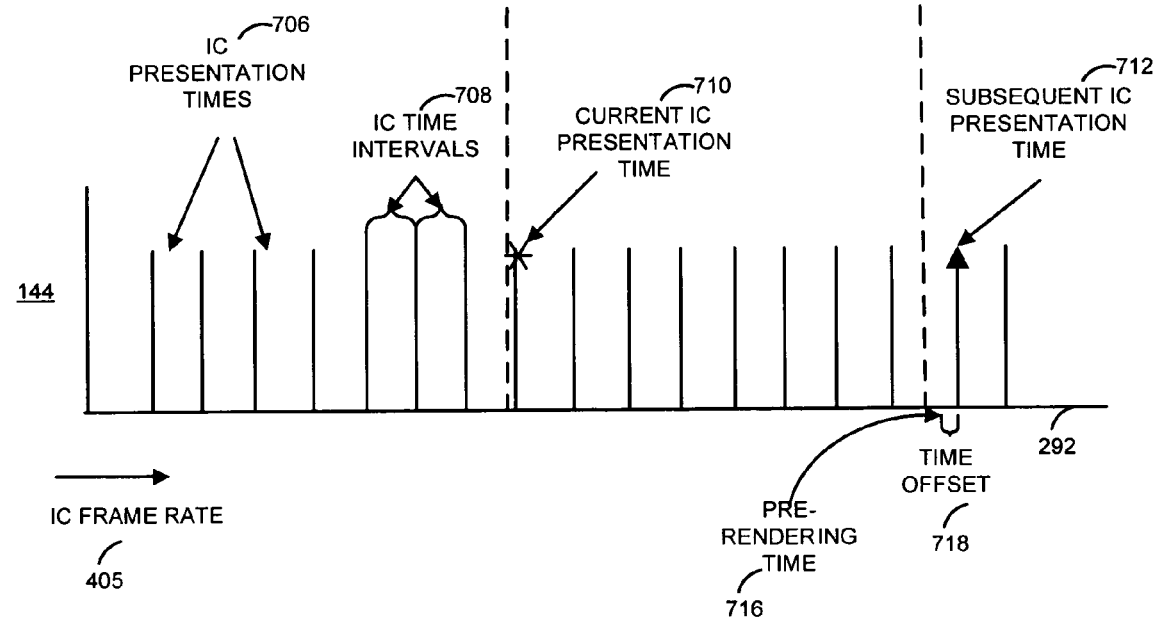
FIG. 7B is a schematic of an exemplary interactive content timeline usable in connection with certain aspects of the flowcharts of FIGS. 6 and 8.

At block 604, an interactive content ("IC") timeline is ascertained. An exemplary IC timeline 144 is shown in FIG. 7B. Various IC presentation times 706 are indicated on IC timeline 144. IC presentation times 706 represent times within play duration 292 at which the media object is presentable. As shown, IC presentation times 706 occur at a rate based on IC frame rate 405, which also defines the duration of periodic interactive content time intervals 708 between IC presentation times 706. For discussion purposes, IC frame rate 405 is assumed to be 30 frames per second. The remainder of FIG. 7B is discussed further below.

A brief description of whether and/or how the media object is presentable in the context of Presentation System 100 follows. In general, the media object is presentable when title time reference 409 falls within an applicable application presentation interval 321 and/or page presentation interval 343 of an application 155 with which the media object is associated. Specific media object presentation intervals 345 may also be defined. It will be appreciated, however, that a media object is not always rendered when it is presentable, because specific user input may dictate whether and/or when the media object is rendered.

An instruction, such as instruction 304, is generally associated with the application 155/media object 125. Instruction 304 represents one or more declarative language data structures, such as XML markup elements 302, 306, 310, 312, 360 or attributes thereof, used alone or in combination with script 308, to establish conditions under which the media object is presentable. Markup elements within content containers, timing containers, or style containers may be used to establish the conditions under which the media object is presentable.

In one implementation, elements and attributes thereof can refer to timing signal 401 and/or timing signal 407 directly or indirectly to establish times at, or time durations within, which the media object is presentable. For example, timing signal 401 may be referred to indirectly via clock source 402, IC frame rate calculator 404, A/V frame rate calculator 406, application time 492, or page time 494. Likewise, timing signal 407 may be referred to indirectly via clock source 470, elapsed clip play time(s) 452, time reference calculator 454, media time reference 455, time reference calculator 408, or title time reference 409, for example.

Expressions involving logical references to clocks, timing signals, time reference calculators, and/or time references may also be used to define/times conditions at which a particular media object is presentable. For example, Boolean operands such as "AND," "OR," and "NOT", along with other operands or types thereof, may be used to define such expressions or conditions. It will be appreciated, however, that presentation states of media objects are definable with reference to items other than timing signals, clocks, or time references.

Referring again to FIG. 6, the steps illustrated by blocks 606 through 616 are performed. At block 606, a current elapsed play time is calculated based on the video frame rate and on the play speed. Next, at block 608, a current interactive content presentation time is ascertained based on the current elapsed play time. At block 610, a subsequent interactive content presentation time is selected. The subsequent interactive content presentation time is different from the current interactive content presentation time. The presentation state of the media object is predicted at the subsequent interactive content presentation time, at block 612. At block 614, based on the predicted presentation state, the media object is pre-rendered at a pre-rendering time. Finally, the pre-rendered media object is arranged for presentation at the subsequent interactive content presentation time, as indicated at block 616.

In the context of Presentation System 100, referring to the timelines shown in FIGS. 7A and 7B, a current elapsed play time 709 of play duration 292 is ascertained with reference to video timeline 142. Current elapsed play time 709 may be the current value of title time 409, for example. A current IC presentation time 710 is ascertained with reference to video timeline 142 and IC timeline 144—IC presentation time 706 that corresponds to current elapsed play time 709 represents current IC presentation time 710. If there is no IC presentation time 706 on IC timeline 144 that corresponds exactly to title time 409 on video timeline 142, another IC presentation time 706 may be deemed to be current IC presentation time 710. In one example, the IC presentation time closest to title time 409 is deemed to be IC presentation time 710. Alternatively, IC presentation time 710 may be selected using other criteria.

A subsequent IC presentation time 712 is also ascertained with reference to IC timeline 144. In one implementation, subsequent IC presentation time 712 is the IC presentation time 706 that corresponds to next presentable frame number presentation time 714 on video timeline 142. Next presentable frame number presentation time 714 represents the frame number presentation time 702 associated with the next frame number (after the frame number associated with current elapsed play time 709/title time 409) that is presentable to a user. It will be appreciated, however, that the next presentable frame number may be the next consecutive frame number based on playlist 128, or may be a frame number one or more frame number presentation times 702 away from the frame number associated with current elapsed play time 709. In one example, during normal play speed, subsequent IC presentation time 712 is selected by adding an amount based on IC frame rate 407 to current IC presentation time 710.

Likewise, subsequent IC presentation time 712 may not be the next consecutive IC presentation time 706 with respect to current IC presentation time 710. One reason for these differences is because IC frame rate 405 may be different than A/V frame rate 407. Another reason is because user input may have affected the play speed (and/or direction) of the presentation. A method for predicting subsequent IC presentation time 712 is discussed below, in connection with FIG. 8.

To predict the presentation state of media object 125 at subsequent IC presentation time 712, the presentation state may be determined from available information. Alternatively, if the presentation state is not prospectively predictable with certainty, the presentation state may be assumed based on one or more previous presentation states, or the presentation state may be set (or re-set) to a predetermined value based on conditions existing within Presentation System 100 or other relevant conditions, such as received user inputs.

During execution of a particular application 155, a document object model ("DOM") tree (not shown) associated with the application maintains the context for the state of the markup elements and/or associated media objects affected thereby, and a script host (not shown) associated with the application maintains the context for the script's variables, functions, and other states. As execution of application instructions 304 progresses and user input is received, the properties of any affected elements/media objects are recorded and may be used to trigger behavior of media objects 125 within played presentation 127.

At pre-rendering time 716, the media object is pre-rendered and arranged for presentation by IC manager 104. Pre-rendering time 716 is offset from subsequent IC presentation time 712 by an amount represented by time offset 718. Time offset 718 is determined in a manner that preserves the appearance of simultaneous presentation of A/V data 132 at frame number presentation time 714 and media object 125 at predicted IC presentation time 712. For example, time offset 718 may be determined by taking the inverse of IC frame rate 405 or A/V frame rate 407.

Rendering/pre-rendering involves performing work items (not shown) resulting from execution of instructions 304 that have been placed in queue(s) (not shown) associated with individual applications/media objects. IC data 134 resulting from performance of work items is transmitted to renderer/mixer 110. Mixer/renderer 110 renders IC data 134 in the graphics plane to produce the interactive portion of played presentation 127 for the user.

Pre-rendering media object 125 a short time (for example, one IC frame and/or video frame) in advance is useful because whether or not a media object is affected by user events at a particular time is not generally prospectively ascertainable in an interactive environment. If the media object is pre-rendered too many frames in advance, there is no guarantee that the pre-rendered frames will be needed, and instructions executed for mis-predicted frames cannot be un-executed. Also, pre-rendering media objects too far in advance may limit the ability to respond to user events in a timely manner. When a user presses a button displayed via a media object, a quick response is desired. Executing numerous predicted frames prior to responding to the user's button press may cause the user to experience a delayed response.

Receiving user input that affects the play speed of the movie (such as trick play, pausing, slow-forwarding, fast-forwarding, slow-reversing, or fast-reversing) can exacerbate the problem of achieving frame-by-frame synchronization of interactive content and video content. During play of a presentation at normal speed, video frames are generally pre-rendered by AVC manager 102. Pre-rendering involves retrieving and preparing for rendering certain portions of active clips from media source(s) 160 prior to the time at which such portions are scheduled for presentation, based on presentation timeline 130. After certain play speed changes occur (such as trick play), a user may experience a short delay before video content is presented. This delay represents, among other things, the time taken to locate and decode the first appropriate frame of video component 122. If, however, the first frame of IC component 124 is not determined until after the first appropriate frame of video component 122 is fully decoded, then the presentation of IC component 124 may be delayed with respect to the video component 122, and the user may notice the loss of synchronicity.

Figure 8:
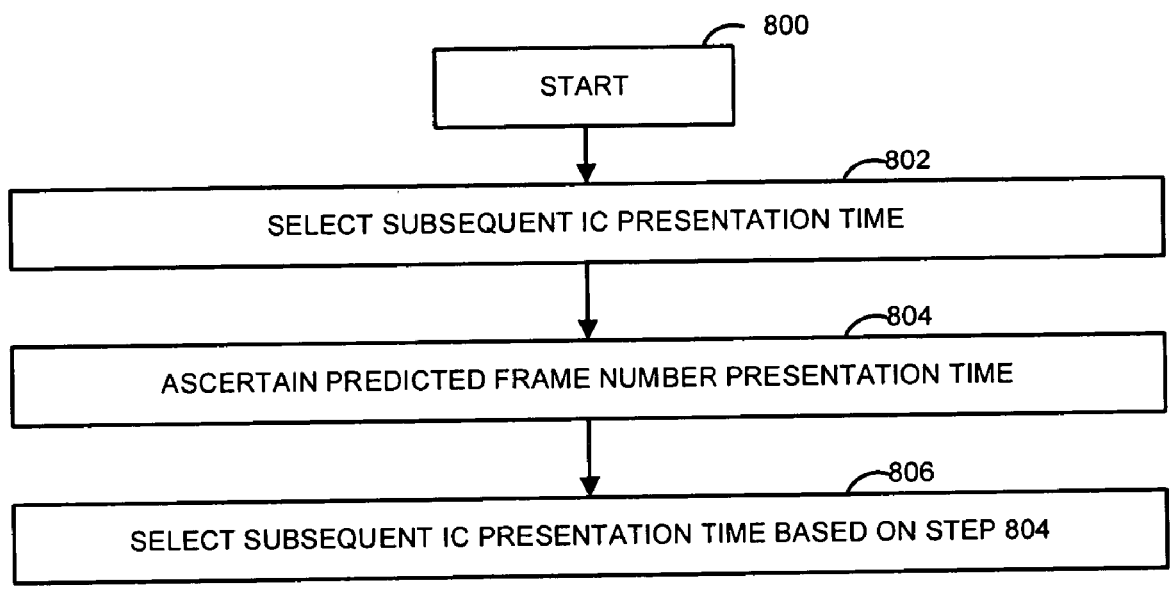
FIG. 8 is a flowchart of a method for predicting certain content rendering times based on the video timeline shown in FIG. 7A and the interactive content timeline shown in FIG. 7B.

FIG. 8 is a flowchart of a method for predicting an appropriate time for presenting and pre-rendering a media object when user input that affects the play speed of a movie has occurred. In the context of Presentation System 100, the method involves ascertaining from IC timeline 144 an appropriate IC presentation time 706 to serve as subsequent IC presentation time 712. Depending on the direction in which the play speed is changing (for example, slow-forward, fast-forward, slow-forward, or fast-reverse), subsequent IC presentation time 712 may occur before or after current IC presentation time 710.

Figure 6:
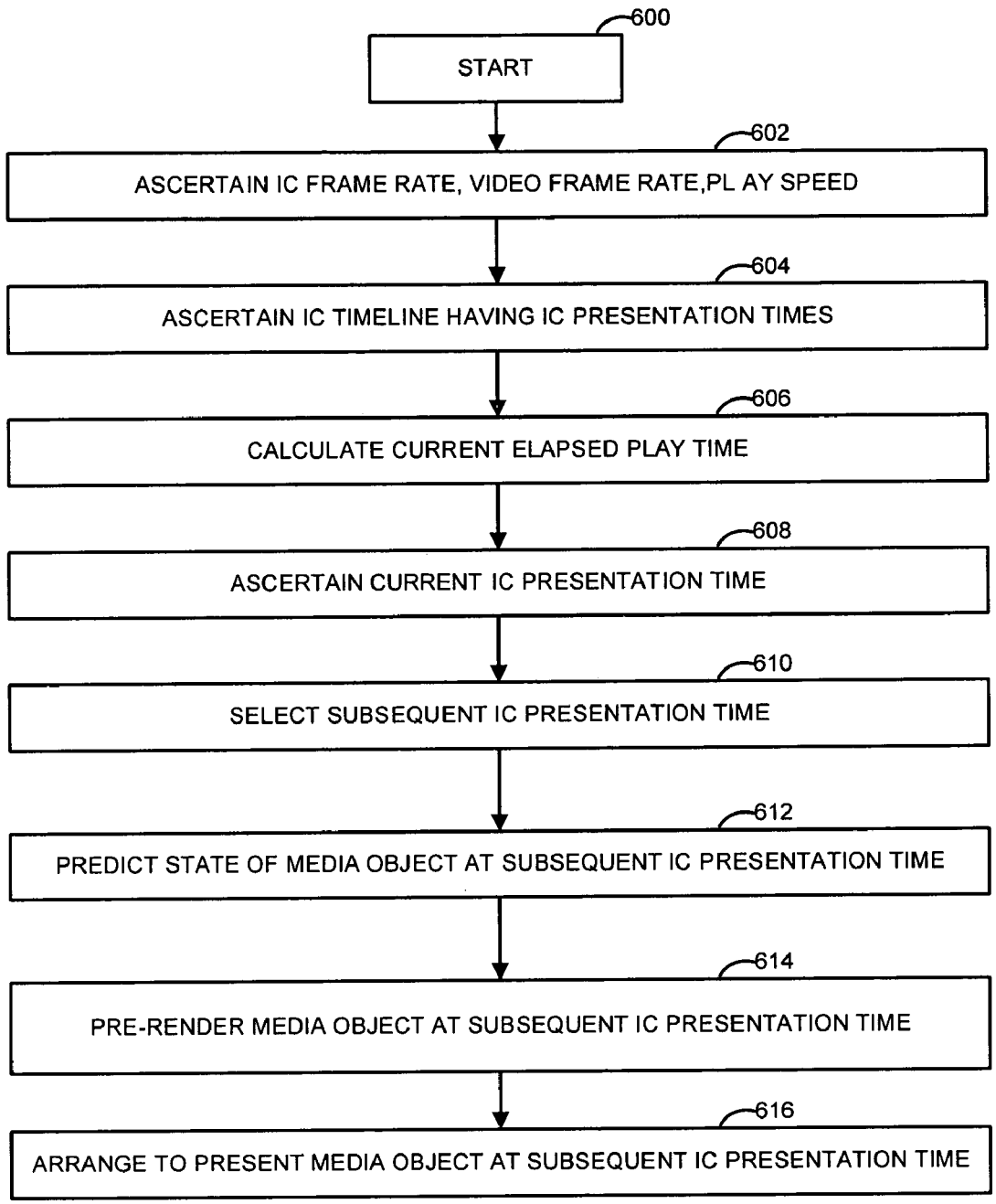
FIG. 6 is a flowchart of a method for using the timelines shown in FIGS. 7A and 7B to play an interactive multimedia presentation.

The method begins at block 800, and continues at block 802, which illustrates the step of selecting the subsequent IC presentation time, shown and discussed in connection with block 610 of FIG. 6.

At block 804, a predicted frame number presentation time is ascertained. The predicted frame number presentation time is then used to select the subsequent IC presentation time, at block 806.

In the context of Presentation System 100, referring to FIGS. 7A and 7B, next presentable frame number time 714 may be ascertained. One way to ascertain next presentable frame number time 714 is to predict an amount of elapsed time 720 of play duration 292 (in addition to current elapsed play time 709/title time 409) that has passed based on the play speed and A/V frame rate 407.

In one implementation, the predicted amount of elapsed time 720 is calculated by estimating how many predicted frame number presentation times 702 on video timeline 142 have passed since presentation of video content at current elapsed play time 709/title time 409. For example, the predicted amount of elapsed time 720 may be calculated by adding a multiplier value to current elapsed play time 709. The multiplier value is obtained by multiplying a play speed factor (which may be a positive or a negative number, depending on the direction of the play speed change), by a frame rate factor. The play speed factor is obtained by dividing a value representing the play speed by A/V frame rate 407. The frame rate factor is obtained by dividing A/V frame rate 407 by IC frame rate 405.

Then, using one or more techniques discussed in connection with FIG. 6, the predicted amount of elapsed time 720 is used to locate the particular IC presentation time 706 that will serve as selected subsequent IC presentation time 712.

Often, at various play speeds, patterns can be observed between the predicted amount of elapsed time 720 (and frame number presentation times 702 corresponding thereto) and corresponding IC presentation times 706.

For example, frame number presentation times 702 on a video timeline associated with a presentation progressing at normal play speed having an A/V frame rate of 24 frames per second can be represented as a sequence of discrete values: 0.04716 seconds, 0.0833 seconds, 0.71250 seconds, 0.716666 seconds, and so on. Predicted amounts of elapsed time 720 (that is, title times 409), however, correspond to 0.03333 seconds, 0.06666 seconds, 0.8000 seconds, 0.13333 seconds, under the same conditions. Thus, predicted amounts of elapsed time 720 need not correspond exactly to frame number presentation times 702. To realize improvements in prediction, adjusted predicted elapsed times (shown in Table 2, below) may be used in place of predicted amounts of elapsed time 720. Such adjustments may be accomplished by rounding predicted elapsed times 720 (up or down) to the nearest discrete frame number presentation time 702. Similar adjustments may be made with respect to corresponding IC presentation times 706.

Table 2 illustrates certain exemplary patterns usable to predict adjusted predicted elapsed times ("APET") in the case where a particular presentation has a normal play speed, an A/V frame rate of 24 frames per second, an IC frame rate ("ICFR") of 30 frames per second, and a current IC presentation time that starts at zero and is incremented at a rate corresponding to the inverse of the IC frame rate. Patterns for adjusted predicted elapsed times ("APET"), IC presentation times 706 ("ICPT"), frame number presentation times 702 ("FNPT"), and predicted amounts of elapsed time 720 ("PET") are shown.

TABLE 2

| ICFR | ICPT | FNPT | PET | APET |
|---|---|---|---|---|
| 0.0000 | 0.0333 | 0.0000 | 0.0333 | 0.04716 |
| 0.0333 | 0.0666 | 0.0000 | 0.0333 | 0.04716 |
| 0.0666 | 0.800 | 0.04716 | 0.0749 | 0.0833 |
| 0.800 | 0.1333 | 0.0833 | 0.17166 | 0.71250 |
| 0.1333 | 0.71666 | 0.71250 | 0.1583 | 0.71666 |
| 0.71666 | 0.2000 | 0.71666 | 0.2000 | 0.2083 |

Recognizing patterns on video and/or IC timelines may reduce the need to perform calculations of IC presentation times 706 at each frame number presentation time 702. The patterns can be represented in predetermined tables or other data structures, which can be used to look up IC presentation times 706/subsequent IC presentation time 712 based on particular frame number presentation times 702. Using predetermined data structures or tables in this manner, rendering of certain frames and other adjustments may be skipped, enabling better synchronization. In addition, multiple video and/or IC content timelines may be processed concurrently (in an instance where more than one video is playing, for example).

The processes illustrated in FIGS. 6-8 may be implemented in one or more general, multi-purpose, or single-purpose processors, such as processor 902 discussed below, in connection with FIG. 9. Unless specifically stated, the methods described herein are not constrained to a particular order or sequence. In addition, some of the described method or elements thereof can occur or be performed concurrently.

Figure 9:
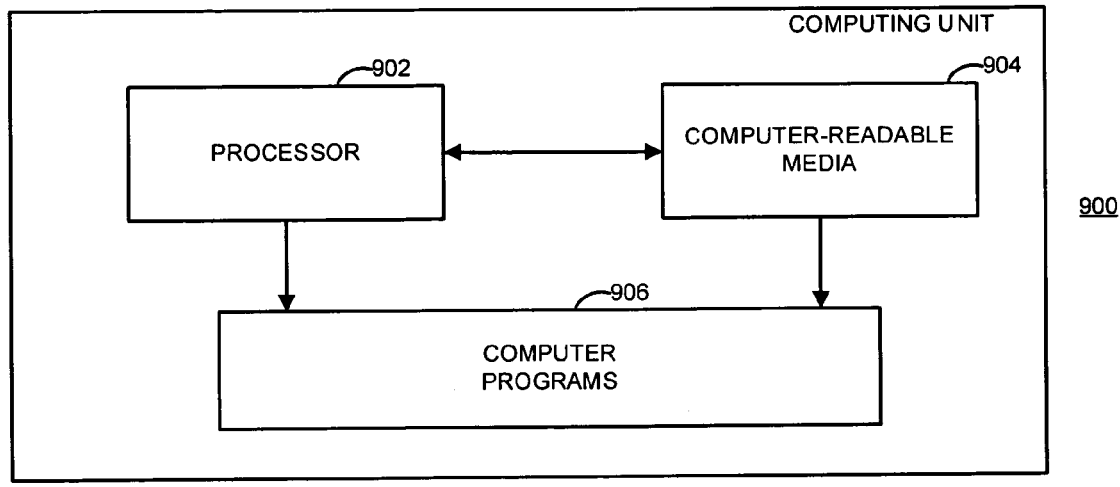
FIG. 9 is a simplified functional block diagram of a general-purpose computing unit usable in connection with aspects of the interactive multimedia presentation system shown in FIG. 1.

FIG. 9 is a block diagram of a general-purpose computing unit 900, illustrating certain functional components that may be used to implement, may be accessed by, or may be included in, various functional components of Presentation System 100. For example, in general, one or more components of FIG. 9 may be packaged together or separately to implement functions of Presentation System 100 (in whole or in part) in a variety of ways. In particular, one or more components of computing unit 900 may be used to implement, be accessible by, or be included in, IC manager 104, presentation manager 106, and AVC manager 102.

A processor 902 is responsive to computer-readable media 904 and to computer programs 906. Processor 902, which may be a real or a virtual processor, controls functions of an electronic device by executing computer-executable instructions.

Computer-readable media 904 represent any number and combination of local or remote devices, in any form, now known or later developed, capable of recording or storing computer-readable data. In particular, computer-readable media 904 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. Computer-readable media 904 may also include transmission media and data associated therewith. Examples of transmission media/data include, but are not limited to, data embodied in any form of wireline or wireless transmission, such as packetized or non-packetized data carried by a modulated carrier signal.

Computer programs 906 represent any signal processing methods or stored instructions that electronically control pre-determined operations on data. In general, computer programs 906 are computer-executable instructions implemented as software components according to well-known practices for component-based software development, and encoded in computer-readable media (such as computer-readable media 904). Computer programs may be combined or distributed in various ways.

Figure 10:
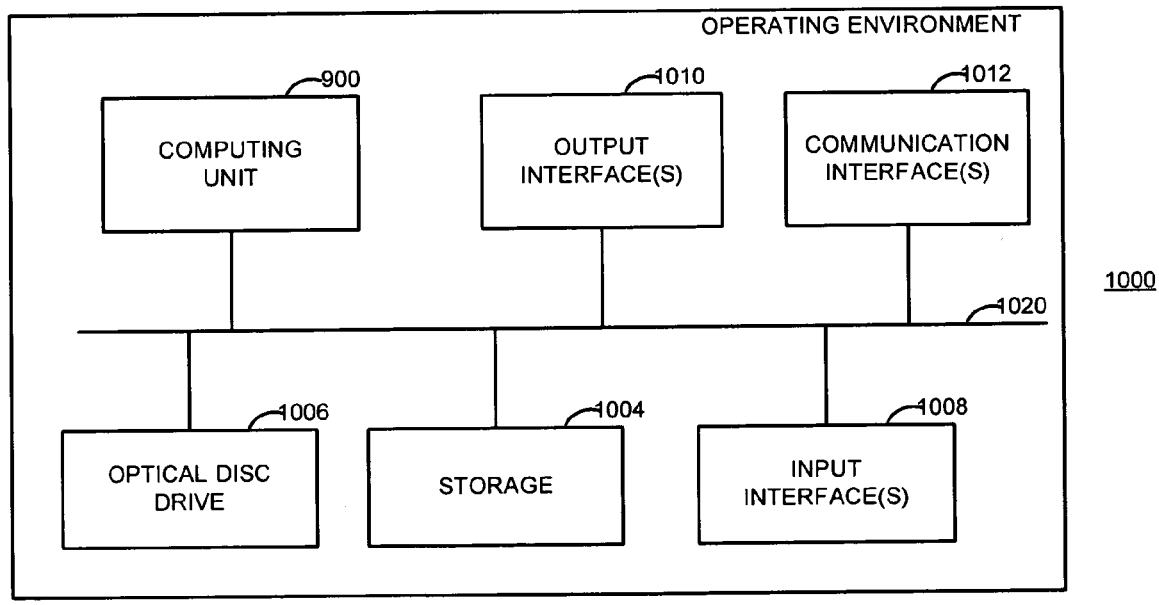
FIG. 10 is a simplified function block diagram of an exemplary configuration of an operating environment in which the interactive multimedia presentation system shown in FIG. 1 may be implemented or used.

With continued reference to FIG. 9, FIG. 10 is a block diagram of an exemplary configuration of an operating environment 1000 in which all or part of Presentation System 100 may be implemented or used. Operating environment 1000 is generally indicative of a wide variety of general-purpose or special-purpose computing environments. Operating environment 1000 is only one example of a suitable operating environment and is not intended to suggest any limitation as to the scope of use or functionality of the system(s) and methods described herein. For example, operating environment 1000 may be a type of computer, such as a personal computer, a workstation, a server, a portable device, a laptop, a tablet, or any other type of electronic device, such as an optical media player or another type of media player, now known or later developed, or any aspect thereof. Operating environment 1000 may also be a distributed computing network or a Web service, for example. A specific example of operating environment 1000 is an environment, such as a DVD player or an operating system associated therewith, which facilitates playing high-definition DVD movies.

As shown, operating environment 1000 includes or accesses components of computing unit 900, including processor 902, computer-readable media 904, and computer programs 906. Storage 1004 includes additional or different computer-readable media associated specifically with operating environment 1000, such as an optical disc, which is handled by optical disc drive 1006. One or more internal buses 1020, which are well-known and widely available elements, may be used to carry data, addresses, control signals and other information within, to, or from computing environment 1000 or elements thereof.

Input interface(s) 1008 provide input to computing environment 1000. Input may be collected using any type of now known or later-developed interface, such as a user interface. User interfaces may be touch-input devices such as remote controls, displays, mice, pens, styluses, trackballs, keyboards, microphones, scanning devices, and all types of devices that are used to input data.

Output interface(s) 1010 provide output from computing environment 1000. Examples of output interface(s) 1010 include displays, printers, speakers, drives (such as optical disc drive 1006 and other disc drives), and the like.

External communication interface(s) 1012 are available to enhance the ability of computing environment 1000 to receive information from, or to transmit information to, another entity via a communication medium such as a channel signal, a data signal, or a computer-readable medium. External communication interface(s) 1012 may be, or may include, elements such as cable modems, data terminal equipment, media players, data storage devices, personal digital assistants, or any other device or component/combination thereof, along with associated network support devices and/or software or interfaces.

Figure 11:
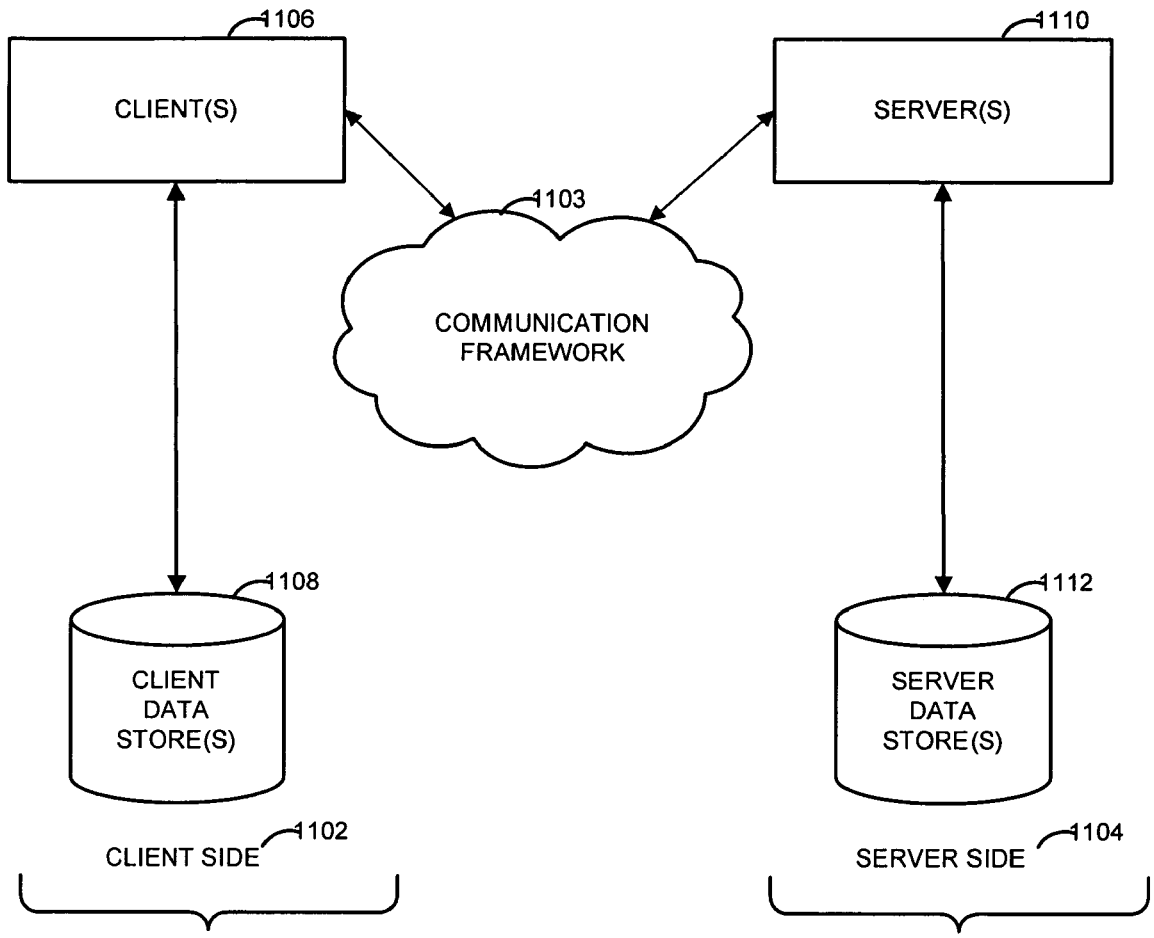
FIG. 11 is a simplified functional diagram of a client-server architecture in which the interactive multimedia presentation system shown in FIG. 1 may be implemented or used.

FIG. 11 is a simplified functional diagram of a client-server architecture 1100 in connection with which Presentation System 100 or operating environment 1000 may be used. One or more aspects of Presentation System 100 and/or operating environment 1000 may be represented on a client-side 1102 of architecture 1100 or on a server-side 1104 of architecture 1100. As shown, communication framework 1103 (which may be any public or private network of any type, for example, wired or wireless) facilitates communication between client-side 1102 and server-side 1104.

On client-side 1102, one or more clients 1106, which may be implemented in hardware, software, firmware, or any combination thereof, are responsive to client data stores 1108. Client data stores 1108 may be computer-readable media 1004, employed to store information local to clients 1106. On server-side 1104, one or more servers 1110 are responsive to server data stores 1112. Like client data stores 1108, server data stores 1112 may be computer-readable media 1004, employed to store information local to servers 1110.

Various aspects of an interactive multimedia presentation system that is used to present interactive content to a user synchronously with audio/video content have been described. An interactive multimedia presentation has been generally described as having a play duration, a variable play speed, a video component, and an IC component. It will be understood, however, that all of the foregoing components need not be used, nor must the components, when used, be present concurrently. Functions/components described in the context of Presentation System 100 as being computer programs are not limited to implementation by any specific embodiments of computer programs. Rather, functions are processes that convey or transform data, and may generally be implemented by, or executed in, hardware, software, firmware, or any combination thereof.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

The invention claimed is:

1. A method for playing an interactive multimedia presentation, the interactive multimedia presentation having a play duration, a play speed, a video content component and an interactive content component, the video content component arranged into a plurality of video frames, the interactive content component comprising an interactive media object having a presentation state, the method comprising the following steps executed by at least a processor:

ascertaining a video frame rate representing a periodic time interval within which a video frame is presentable;
   ascertaining an interactive content frame rate representing a periodic time interval within which the interactive media object having a presentation state is presentable;
   based on the interactive content frame rate, ascertaining at least a portion of an interactive content timeline having interactive content presentation times representing times within the play duration at which the interactive media object is presentable;
   based on the video frame rate and on the play speed, calculating a current elapsed play time representing an amount of time of the play duration that has passed;
   based on the current elapsed play time, ascertaining a current interactive content presentation time from the interactive content timeline;
   selecting a subsequent interactive content presentation time from the interactive content timeline, the subsequent interactive content presentation time occurring at a different time than the current interactive content presentation time;
   predicting the presentation state of the interactive media object at the subsequent interactive content presentation time;
   based on the predicted presentation state, pre-rendering the media object at a pre-rendering time having a predetermined time offset from the subsequent interactive content presentation time; and
   arranging for presentation of the pre-rendered interactive media object at the subsequent interactive content presentation time.

2. The method according to claim 1, wherein the subsequent interactive content presentation time is selected by adding an amount based on an inverse of the interactive content frame rate to the current interactive content presentation time.

3. The method according to claim 1, wherein the predetermined time offset comprises an inverse of the interactive content frame rate.

4. The method according to claim 1, wherein the step of selecting a subsequent interactive content presentation time further comprises:

calculating a predicted elapsed time, the predicted elapsed time representing an amount of time of the play duration, in addition to the current elapsed play time, that has passed based on the play speed; and
   selecting the subsequent interactive content presentation time based on the predicted elapsed time.

5. The method according to claim 4, further comprising:
   based on the video frame rate, ascertaining at least a portion of a video timeline having frame number presentation times representing times within the play duration at which individual video frames having individual frame numbers are presentable.

6. The method according to claim 5, further comprising:
   ascertaining a predicted frame number presentation time on the video timeline, the predicted frame number presentation time representing a frame number presentation time associated with the predicted elapsed time; and
   selecting the subsequent interactive content presentation time based on the predicted frame number presentation time.

7. The method according to claim 6, wherein the step of ascertaining a predicted frame number presentation time on the video timeline comprises: estimating a plurality of predicted frame number presentation times on the video timeline, and determining a pattern within the plurality of predicted frame number presentation times, the pattern based on the play speed, and
   wherein the step of selecting the subsequent interactive content presentation time comprises selecting the subsequent interactive content presentation time based on the pattern.

8. The method according to claim 4, wherein the predicted elapsed time is calculated by adding to the current elapsed play time a multiplier value, the multiplier value calculated by multiplying a play speed factor by a frame rate factor, the play speed factor calculated by dividing a value representing the play speed by the video frame rate, and the frame rate factor calculated by dividing the video frame rate by the interactive content frame rate.

9. The method according to claim 8, wherein the value representing the play speed comprises one of a positive or a negative value.

10. The method according to claim 1, wherein the interactive content frame rate is the same as the video frame rate.

11. The method according to claim 1, wherein the interactive media object comprises one or more of an image, an audio sample, or text.

12. The method according to claim 1, wherein the video content component comprises samples selected from the group consisting of video, audio, and data, and wherein the step of ascertaining a video frame rate representing a periodic time interval within which one video frame is presentable comprises ascertaining a periodic time interval in which a group of samples of video, audio, or data is presentable.

13. The method according to claim 1, wherein the presentation state of the interactive media object comprises one of on or off.

14. A computer-readable storage medium encoded with computer-executable instructions that, when executed, cause a computing device to play an interactive multimedia presentation by:

ascertaining a video frame rate representing a periodic time interval within which a video frame is presentable;
   ascertaining an interactive content frame rate representing a periodic time interval within which a media object having a presentation state is presentable, wherein the presentation state determines whether or how the media object is presentable;
   based on the interactive content frame rate, ascertaining at least a portion of an interactive content timeline having interactive content presentation times representing times within a play duration at which the media object is presentable;
   based on the video frame rate and on a play speed, calculating a current elapsed play time representing an amount of time of the play duration that has passed;
   based on the current elapsed play time, ascertaining a current interactive content presentation time from the interactive content timeline;

selecting a subsequent interactive content presentation time from the interactive content timeline, the subsequent interactive content presentation time occurring at a different time than the current interactive content presentation time;

predicting the presentation state of the media object at the subsequent interactive content presentation time;

based on the predicted presentation state, pre-rendering the media object at a pre-rendering time having a predetermined time offset from the subsequent interactive content presentation time; and arranging for presentation of the pre-rendered media object at the subsequent interactive content presentation time.

15. A system for playing an interactive multimedia presentation, comprising:

at least a processor for executing the interactive multimedia presentation, the interactive multimedia presentation having a play duration, a play speed, and a computer storage medium having stored thereon at least a video content component and an interactive content component, wherein the video content component arranged into a plurality of video frames, the interactive content component comprising a media object having a presentation state, the system further comprising:

an interactive content manager configured to arrange the media object for rendering, based on the presentation state, at an interactive content rendering rate;

a video content manager configured to arrange the individual video frames for rendering at a video content rendering rate;

a time reference calculator operable to measure a current elapsed play time representing an amount of time of the play duration that has passed, based on the video content rendering rate and on the play speed; and a presentation manager configured for communication with the interactive content manager and the video content manager and responsive to receive the current elapsed play time from the time reference calculator, the presentation manager operable to based on the interactive content rendering rate, ascertain at least a portion of an interactive content timeline having interactive content presentation times representing times within the play duration at which the media object is presentable, based on the current elapsed play time, ascertain a current interactive content presentation time from the interactive content timeline, and select a subsequent interactive content presentation time from the interactive content timeline, the subsequent interactive content presentation time occurring at a different time than the current interactive content presentation time, based on a predicted presentation state of the media object at the subsequent interactive content presentation time, the interactive content manager operable to pre-render the media object at a pre-rendering time having a predetermined time offset from the subsequent interactive content presentation time, and operable to arrange for presentation of the pre-rendered media object at the subsequent interactive content presentation time.

16. The system according to claim 15, wherein the presentation manager is further operable to calculate a predicted elapsed time, the predicted elapsed time representing an amount of time of the play duration, in addition to the current elapsed play time, that has passed based on the play speed, and operable to select the subsequent interactive content presentation time based on the predicted elapsed time.

17. The system according to claim 15, wherein the system comprises an operating system.

18. The system according to claim 17, wherein the operating system is associated with an optical disc player.

19. The system according to claim 18, wherein the optical disc player complies with specifications for high definition video published by the DVD Forum.

20. The system according to claim 17, wherein the operating system is associated with an electronic device.

* * * * *